United States Patent [19]
Sfarti et al.

[11] Patent Number: 5,528,738
[45] Date of Patent: Jun. 18, 1996

[54] METHOD AND APPARATUS FOR ANTIALIASING RASTER SCANNED, POLYGONAL SHAPED IMAGES

[75] Inventors: Adrian Sfarti, Sunnyvale; Gunawan Ali-Santosa, Milpitas, both of Calif.

[73] Assignee: Silicon Graphics, Inc., Mountain View, Calif.

[21] Appl. No.: 132,615

[22] Filed: Oct. 6, 1993

[51] Int. Cl.⁶ ........................................................ G06F 3/14
[52] U.S. Cl. .................................................................. 395/143
[58] Field of Search ................................... 395/143, 141, 395/142; 345/136, 137, 138

[56] References Cited

U.S. PATENT DOCUMENTS

| | | | |
|---|---|---|---|
| 4,475,104 | 10/1984 | Shen | 340/729 |
| 4,698,768 | 10/1987 | Thuy et al. | 364/521 |
| 4,758,965 | 7/1988 | Liang et al. | 364/518 |
| 4,878,182 | 10/1989 | Aranda et al. | 364/518 |
| 5,073,960 | 12/1991 | Nakai et al. | 382/22 |

FOREIGN PATENT DOCUMENTS 4113851  11/1991  Germany.

OTHER PUBLICATIONS

Barkans, "High Speed Quality Antialiased Vector Generation", Computer Graphics, vol. 24, No. 4, pp. 319–322, Aug. 1990.

Wu, "An Efficient Antialiasing Technique", Computer Graphics, vol. 25, No. 4, pp. 143–147, Jul. 1991.

Foley, et al., Fundamentals of Interactive Computer Graphics, pp. 132–142 and 432–463, Jul. 1984.

Sfarti "Antialiased Bresenham Lines for x Implementation", Computer Graphics, International, Tokyo, Jun. 26, 1992.

*Primary Examiner*—Phu K. Nguyen
*Attorney, Agent, or Firm*—Timothy D. Casey

[57] ABSTRACT

A method and apparatus for drawing at least a one pixel wide antialiased line on an edge of a filled polygon. The apparatus comprises an interpolator, having a set up unit and an iterator unit, and a blender. The set up unit determines various parameters of the line to be drawn and selects a pair of pixels adjacent to and straddling an idealized line representing the line to be drawn, where the first pixel is claimed by the edge of the polygon as a filled pixel. The iterator unit determines the coverages of the second pixel based on the parameters output by the set up unit. The blender determines the color intensity value of the second pixel as a function of its coverage and writes the color value into a memory. The apparatus also incorporates methods for antialiasing polygon meshes and resolving accumulation error in the derivation of each pixel's position.

14 Claims, 12 Drawing Sheets

METHOD AND APPARATUS FOR ANTIALIASING RASTER SCANNED, POLYGONAL SHAPED IMAGES

FIELD OF THE INVENTION

The present invention relates generally to raster scan graphics display systems, and more particularly to a graphics display apparatus employing improved methods for antialiasing raster scanned, polygonal shaped images, such as triangles and meshes.

IDENTIFICATION OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BRIEF DESCRIPTION OF BACKGROUND ART

Graphics workstations include at least some form of scan conversion hardware which samples points, lines and polygons to be drawn on a display. Lower cost workstations typically utilize a single infinitely small sample per pixel, thereby resulting in primitive renderings that exhibit some aliasing artifacts. A commonly used scan conversion algorithm in such low cost systems, which results in aliased lines, is the Bresenham line algorithm. This algorithm is popular because it uses only integer arithmetic. At each iteration, the Bresenham line algorithm selects between the two pixels closest to the ideal position of the line on the grid represented by the display, based on the sign of an error term "d," turning on one pixel and leaving the other pixel off. A standard implementation of this algorithm is as follows:

```
dx=ABS(x1-x2)
dy=ABS(y1-y2)
d=2dy-dx                    //initial value of d for Octant 1//
incr1=2dy
incr2=2(dy-dx)
incrx1=1
incrx2=1                    //always step in x//
incry1=0
incry2 =1                   //conditional step in y//
For i=1 to dx Do
Begin
  if d<0 Then
    Begin                   //Select pixel S below the line//
      x=x+incrx1
      y=y+incry1
      d=d+incr1
    End Else
    Begin                   //Select pixel T above the line//
      x=x+incrx2
      y=y+incry2
      d=d+incr2
    End
  Write_Pixel(x,y,color)
End
```

The explanatory terms "above" and "below" are used relative to the drawing octant. For example, when in octant 2, "above" means to the right of the centerline and "below" means to the left of the centerline.

Since the Bresenham algorithm causes the resulting one pixel wide line to have jagged edges, or alias artifacts, numerous techniques have been developed to remove these artifacts, or in other words, to antialias the line. A further explanation of the Bresenham line algorithm and techniques for antialiasing such lines is provided by J. D. Foley and A. Van Dam, "Fundamentals of Interactive Computer Graphics," 1983, pp. 433–437, incorporated by reference herein.

Two of the primary techniques for line antialiasing are area sampling and multi-point sampling. In area sampling, the fraction of each pixel that is covered by a line is computed (perhaps also using multiplication by a filter function), and the resulting fractions are blended to obtain a final pixel shading for each covered or partially covered pixel. In multi-point sampling, many point samples are taken in the region of each pixel, and these samples are integrated (again, perhaps also utilizing a weighting function) to obtain pixel shading. A more detailed explanation of modern antialiasing techniques is described by J. D. Foley and A. Van Dam in "Computer Graphics—Principles and Practice" 1990, pp. 132–142, incorporated by reference herein.

An improvement to the Bresenham algorithm is described by Adrian Sfarti in "Antialiased Bresenham Lines for X Implementation", Proceedings of the 10th International Conference of the Computer Graphics Society, CG International 1992, *Visual Computing—Integrating Computer Graphics with Computer Vision—*, Tokyo, Japan (Jun. 26, 1992), pp. 639–659, incorporated by reference herein. In Sfarti, the standard Bresenham algorithm is extended to two pixel wide lines as follows:

```
dx=ABS(x1-x2)
dy=ABS(y1-y2)
e1=dy/dx
e2=e1-1
d=2dy-dx                    //initial value of d for Octant 1//
s=e1
incr1=2dy
incr2=2(dy-dx)
incrx1=1
incrx2=1                    //always step in x//
incry1=0
incry2=1                    //conditional step in y//
For i=1 to dx Do
Begin
  If d<0 Then
    Begin                   //Select pixel S below the line//
      x=x+incrx1
      y=y+incry1
      d=d+incr1
      s=s+e1
    End Else
    Begin                   //Select pixel T above the line//
      x=x+incrx2
      y=y+incry2
      d=d+incr2
      s=s+e2
    End
  Write_Pixel(x,y,color)
End
```

In the above code, the basic Bresenham algorithm is modified by adding the term "s," where s is the vertical distance from the line to the pixel center just below it, and the term "t," which is equal to the vertical distance from the line to the pixel center just above it. The term t is a function of s, in that t=1−s. In this improved version of the Bresenham algorithm, d=(s−t)*dx. Since s+t=1, it follows that s=(1+d/dx)/2 and t=(1−d/dx)/2. Thus, as d varies at each iteration of the line by either incr1 or incr2, s will vary accordingly, either by e1=incr1/(2dx) or e2=incr2/(2dx). This operation allows the algorithm to avoid dividing at each iteration, since the terms e1 and e2 are constant increments that can be precomputed.

Sfarti also discusses how pixel coverages are computed, how steps can be taken to compensate for the effect of certain line slopes, and how fractional endpoints are calculated so that the line to be drawn is correctly positioned. Sfarti also discusses a technique for compensating for the effect of a third pixel intersected by the line to be drawn. As noted by Sfarti, since the two-pixel wide extension can only reference two pixels at a time, any third pixel intersected by the line would need to be neglected in order to maintain coverage formulas for the other intersected pixels. Although Sfarti discusses an attempt to compensate for neglecting the effect of the third pixel, this attempt was merely that, and does not accurately approximate the effect of the third pixel.

As discussed above, many antialiasing techniques employ filter functions. However, attempts to use hardware to incrementally compute a filter function while rendering tends to require the use of a simple filter function because better filters are too computationally expensive. Line antialiasing methods based on box postfiltering are also computationally expensive and do not produce a pixel coverage that is useful for an implementation of an alpha-buffer. An alternative approach is to precompute a set of filter values and store them in a look-up table, a technique described by the Gupta-Sproull algorithm (which requires integer arithmetic), and more specifically described by A. C. Barkans in "High Speed High Quality Antialiased Vector Generation", ACM Computer Graphics, Volume 24, Number 4, August 1990, incorporated herein by reference, which is directed to the use of a precomputed filter function in combination with the Bresenham algorithm.

Sfarti also describes the application of a filtering function to provide additional improvements in pixel coverage computation. Accordingly, the application of a circular cone filter 10 about the line 12, as illustrated in FIG. 1 against the grid 14, has the advantages of being rotationally symmetric and of providing for pixel coverage computation at each iteration. Unfortunately, such a filter is also computationally expensive because it requires three multiplications per iteration. As discussed by Sfarti, the advantages of this filter can be obtained, however, without its disadvantages, by precomputing the filter function and utilizing the s value in conjunction with the error term d as an index to an integral lookup table that contains the computed pixel coverages.

The distance s, as shown in FIG. 1, is used for computing pixel coverage since the convolution integral is a function of the orthogonal distance s*cosa. The computation of s therefore mimics the incremental computation of the Bresenham error term d. Since pixel coverage is a function of the distance between the center of the pixel and the line to be drawn, then d=s*cosa for 0<s<1. Thus, a lookup table that is indexed with s can be used to compute d.

Sfarti also indicates that error terms introduced in the improved algorithm allow for lines to be drawn with very high precision (25 bits). Although the precision of the improved algorithm would appear to be sufficient to render a reasonably accurate line, since the magnitude of s is carefully calculated, subsequent analysis of this algorithm reveals that this is not always the case. In situations where s varies between a negative and positive number, crossing through zero on various occasions, the value of s can be inaccurate enough, even at 25 bits of precision, so as to cause the sign of s to be incorrect. In such instances, pixels can be drawn on the wrong side of a line, thereby causing an artifact. In addition, if this occurred numerous times during the drawing of one line, the line would take on a twisted appearance because of the various line crossings.

It should also be noted that problems have arisen when attempts have been made to apply such line drawing and antialiasing techniques to polygonal images. The most significant of these problems relates to the accurate sampling of pixels inside the polygonal image.

One object of the invention is to improve prior implementations of line drawing procedures.

A further object of the invention is to improve the accuracy of line drawing procedures.

Still another object of the invention is to improve the rendering of antialiased polygons and meshes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

A preferred embodiment of the present invention comprises a method and apparatus for drawing at least a one pixel wide antialiased line on an edge of a filled polygon. The apparatus comprises an interpolator, having a set up unit and an iterator unit, and a blender. The set up unit determines various parameters of the line to be drawn and selects a pair of pixels adjacent to and straddling an idealized line representing the line to be drawn, where the first pixel is claimed by the edge of the polygon as a filled pixel. The iterator unit determines the coverages of the second pixel based on the parameters output by the set up unit. The blender determines the color intensity value of the second pixel as a function of its coverage and writes the color value into a memory. The apparatus also incorporates methods for antialiasing polygon meshes and resolving accumulation error in the derivation of each pixel's position.

DETAILED DESCRIPTION OF PREFERRED EMBODIMENT

Figure 1:
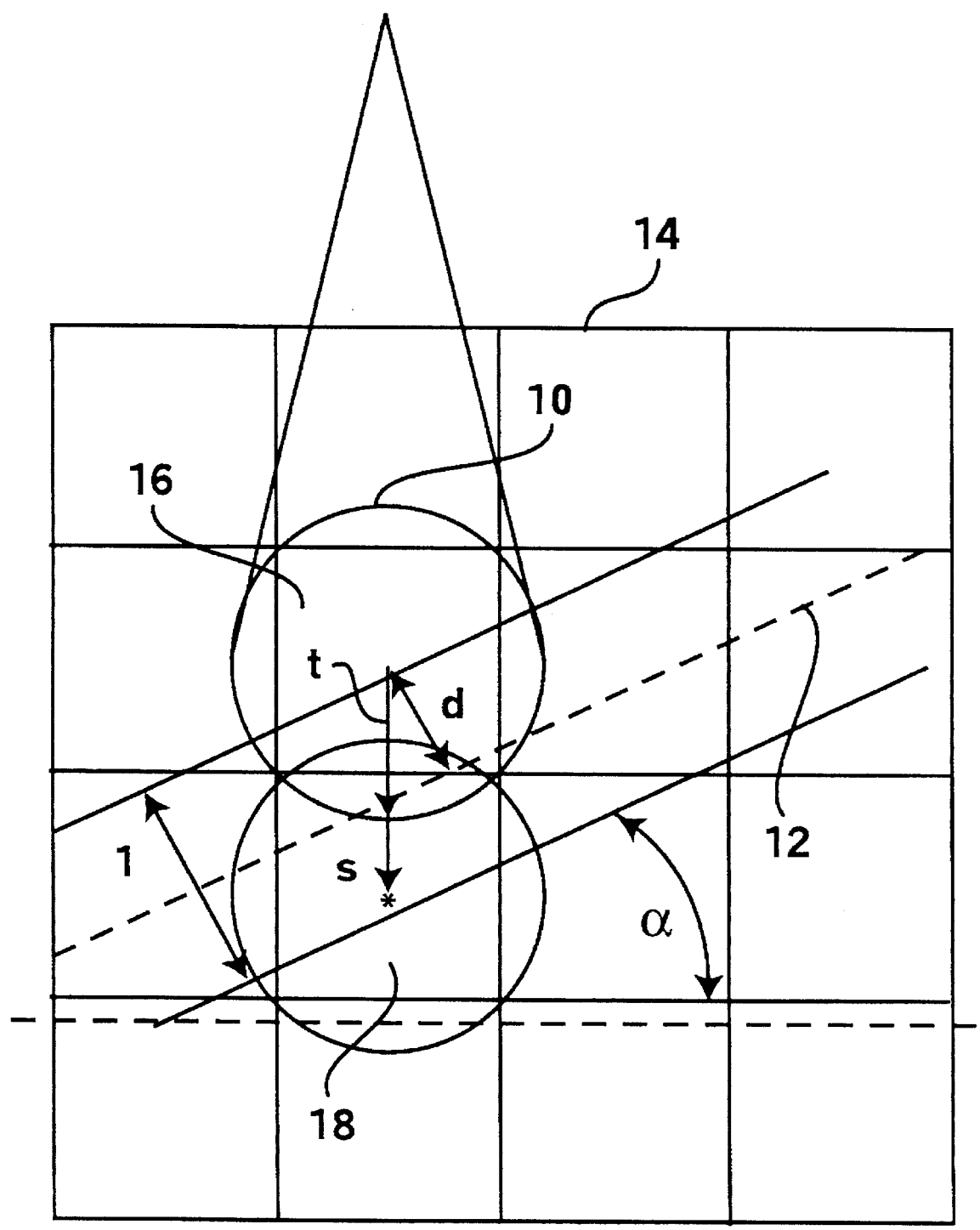
FIG. 1 is an illustration demonstrating how a circular cone filter is applied to a line projected against a grid of pixels.

In the discussion of the background art above, a two-pixel wide line drawing process was described as an improved implementation of the basic Bresenham process. In accordance with Sfarti, it was indicated that it was not necessary to accurately accommodate for the effect of a third intersected pixel on the line to be drawn. It has been found, however, that projected lines can be rendered more correctly in accordance with the three pixel wide line drawing process described below. By drawing a three pixel wide line, the effect of a third intersected pixel can be accurately factored into the rendered line.

A process for drawing a three pixel wide line is described as follows:

Select a first pixel closest to an idealized line between the start point and the end point of the line;

select a second pixel adjacent to the first pixel, such that the first pixel and the second pixel form a pair of pixels straddling the idealized line;

select a third pixel adjacent to the first pixel, such that the second pixel and the third pixel frame the first pixel so as to form a line of pixels;

determine a first coverage for the first pixel as a function of a value of a distance between the idealized line and the first pixel (First_Coverage=s=(1+d/dx)/2);

determine a second coverage for the second pixel as a function of a value of a distance between the idealized line and the second pixel (Second_Coverage=t=(1−d/dx)/2);

determine a third coverage for the third pixel as a function of a value of a distance between the idealized line and the third pixel (Third_Coverage=min(t+1, s+1);

determine an intensity for the line of pixels as a function of the first coverage, the second coverage, and the third coverage;

write color values into a frame buffer memory for the line of pixels based on the intensity of the line of pixels;

output the color values for the line of pixels to a display; and repeat the above steps until color values for each of a plurality of adjacent lines of pixels between the start point and the end point have been output to the display.

Having now described an implementation of a three-pixel wide line drawing process, it is important to note that the value of s, in any of the above processes, is affected by the precision of computing the slope of the line and error accumulation which can result during the computation of pixel coverage. While the computation of a pixel's position is always exact, the computation of a pixel's coverage is subject to error accumulation.

A pixel's position is exact because coordinates are represented in the 16.4 format (sixteen bits of integer, plus four bits of fraction), and the terms dy and dx are represented exactly in the 17.4 format (as a result of doubling the coordinate range). Thus, the computation of each pixel's position is an exclusive function of the error terms d and sdx (as discussed below), which are always exact and which use the 18.8 format. The computation of a pixel's coverage is not exact because it is a function of s. Since the initial value of the term s is dependent on the slope e1, and since e1 is a floating point number derived from the division dy/dx, s is not exact. In addition, the subsequent values of s are determined by adding e1 or e1−1. Thus, s is the only value in the described processes that is subjected to error accumulation. As previously noted, in some instances, an inaccuracy in the calculation of the value of s can result in s being close to the correct magnitude, but still of the wrong sign.

In the present disclosure, s is computed with four bits of precision. Since the accumulated error in this computation is restricted to being no larger than $2^{(-5)}$ over the X drawing range (i.e. $2^{16}$), the error in computing e1 is restricted to satisfy the condition:

$$error\_e1 < 2^{21}$$

This results in 21 bits of precision for computing e1, which is well within the range of most hardware dividers.

It should be noted, however, that while the value of a pixel's coverage is dependent only on the magnitude of s, the position of the bottom, or "S", pixel is dependent on both the sign and magnitude of s. To therefore alleviate problems which can be caused by an error in the sign of s, the term sdx is utilized in the following disclosure to accomodate for error accumulation. So as to not obfuscate this invention, application of this term is applied to a two pixel wide line. Since error accumulation can occur when computing both two and three pixel-wide lines, however, this solution is equally effective when applied to the three pixel wide process described above.

As discussed, to accomodate for instances where the calculation of s results in s having the wrong sign, the variable sdx=s*2dx is calculated. The sign of this variable can be used to determine the position of the second pixel of the pair of pixels which straddle the line. In accordance with this technique, even though s is still calculated precisely, any error in the value of s is less significant because the sign of s is no longer the sole determining factor with respect to pixel placement.

An application of the variable sdx for a two-pixel wide line is illustrated in the following example:

```
Begin {main}
e1=dy.dx
d=2dy−dx
incr1=2dy
incr2=2(dy−dx)
s=e1
sdx=e1*2dx=incr1
For i=1 to dx Do
Begin
   If d<0 Then
   Begin
      x=x+incrx1
      y=y+incry1
      d=d+incr1
      s=s+e1
      sdx=sdx+incr1
   End Else
   Begin
      x=x+incrx2
      y=v+incry2
      d=d+incr2
      s=s+e2
      sdx=sdx+incr2
   End
   If sdx>0 Then
   Begin
      Coverage_T=aa_table(s)
      Write_Pixel(x,y+1,Coverage_T)
      Coverage_S=aa_table(1−s)
      Write_Pixel(x,y,Coverage_S)
   End Else
   Begin
      Coverage_T=aa_table(1−s)
      Write_Pixel(x,y,Coverage_T)
```

```
        Coverage_S=aa_table(s)
        Write_Pixel(x,y-1,Coverage_S)
      End
    End {main}
```

As is illustrated in FIG. 1, with respect to the above process, the coverages of the top pixel (T) 16 and the bottom pixel (S) 18 are functions of the respective distances s and 1−s. As shown above, the tables, "aa_table(s)" and "aa_table(1−s)" contain the coverages of the two pixels S and T, respectively, expressed as a function of the respective distances s and 1−s. In the present description, circular cone filters are also utilized, due to their advantage of providing overall computational symmetry, to compose the lookup tables. Due to the symmetry of these filters, the total number of necessary tables is equal to one table per octant, which in the preferred embodiment includes a total of eight tables, all of which can be loaded within a single instruction cycle.

Since the actual coverages of the two pixels in these tables are functions of the orthogonal distances (s*cosa), these tables must be reloaded every time a new line is to be redrawn. It should be noted, however, that in practice, reloading these tables does not result in an undue burden because the width of the line varies rather coarsely with the angle of the line and the lookup table needs to be reloaded every time the angle a or the width of the line 12 changes anyway. Also, neither reload operation will present a system bottleneck ff the data path and the lookup table are of the same size.

When the present invention is implemented in a preferred computer system, such as an Indy™ workstation manufactured by Silicon Graphics, Inc., of Mountain View, Calif., s can be calculated with even less precision than discussed by Sfarti without ill effects. Since the data path of the Indy workstation is 64 bits wide, s can be computed with four bits of precision. Since each entry in the lookup tables described above is four bits wide, the lookup table has 64 bits and can therefore be reloaded in one instruction cycle.

The availability of alpha blending, which provides for opacity or translucency information on a pixel-by-pixel basis, is a desirable feature in any graphics display environment. As previously mentioned, certain filtering techniques do not produce pixel coverages that are useful for implementation of alpha blending. Since the present invention utilizes a circular cone filter to produce pixel coverage at each iteration, the full capabilities of an alpha-buffer can be implemented. One manner for implementing such an alpha-buffer is to include the following code following the pixel selection routines described above:

```
Procedure Write_Pixel(x,y,z,alpha,rgb)
Begin
  temp=alpha*RGB+
  (1-alpha)*rgb_buffer
  Write (x,y,temp)                //replace the color//
End
```

This procedure executes alpha blending between the drawing of the color "RGB" and the writing of the framebuffer data "rgb_buffer."

Figure 2:
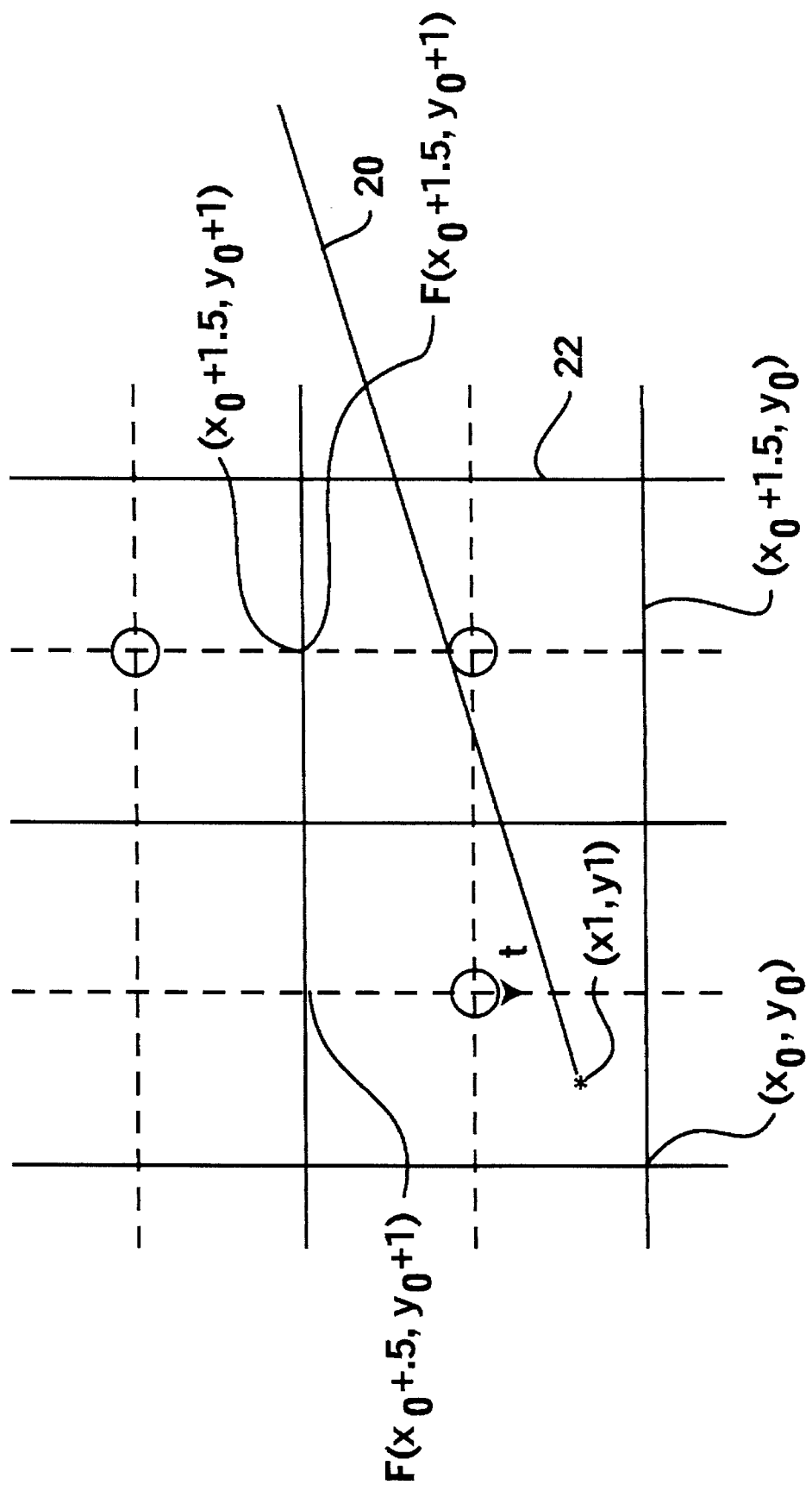
FIG. 2 is an illustration demonstrating the calculation of a starting point of a line having fractional coordinates projected against an integer grid.

An additional image enhancing technique involves adjusting d and s in order to accomodate for fractional endpoints. In the present invention, since endpoint coordinates are fractional, the initial values for d and s need to first be calculated and then adjusted, while the rest of the algorithm remains unchanged. As illustrated in FIG. 2, if the starting point of the line 20 projected against the integer grid 22 is (x1,y1), as expressed in fractional coordinates, then (x0,y0) represents the closest point on the grid 22 to that starting point, wherein x0=int(x+0.5) and y0=int(y+0.5).

The computation of the initial value of d is related to the value of the function:

$$d=2*F(x0+0.5,y0+1)=2[a(x0+0.5)+b(y0+1)+c],$$

where a=dy, b=−dx, c=y1*dx−x1*dy, x0=int(x1)=x1−x1_frac, y0=int(y1)=y1−y1_frac, and where x1_frac and y1_frac are the fractional parts of x1 and y1. After substitution, the initial values of s and d for the first pixel of the line can be obtained as follows:

$$d0=dy-2dx+2(dx*y1\_frac-dy*x1\_frac)\ s=y1\_frac-0.5+e1(0.5-x1\_frac)$$

The d value for the second pixel is dependent on the position of (x1,y1) within the starting pixel. The (x1,y1) position can be measured with the help of a newly introduced variable E, where $$E=2*dx*[y1\_frac+e1(1.5-x1\_frac)-2]=3dy-4dx+2(dx*y1\_frac-dy*x1\_frac)$$

Figure 3:
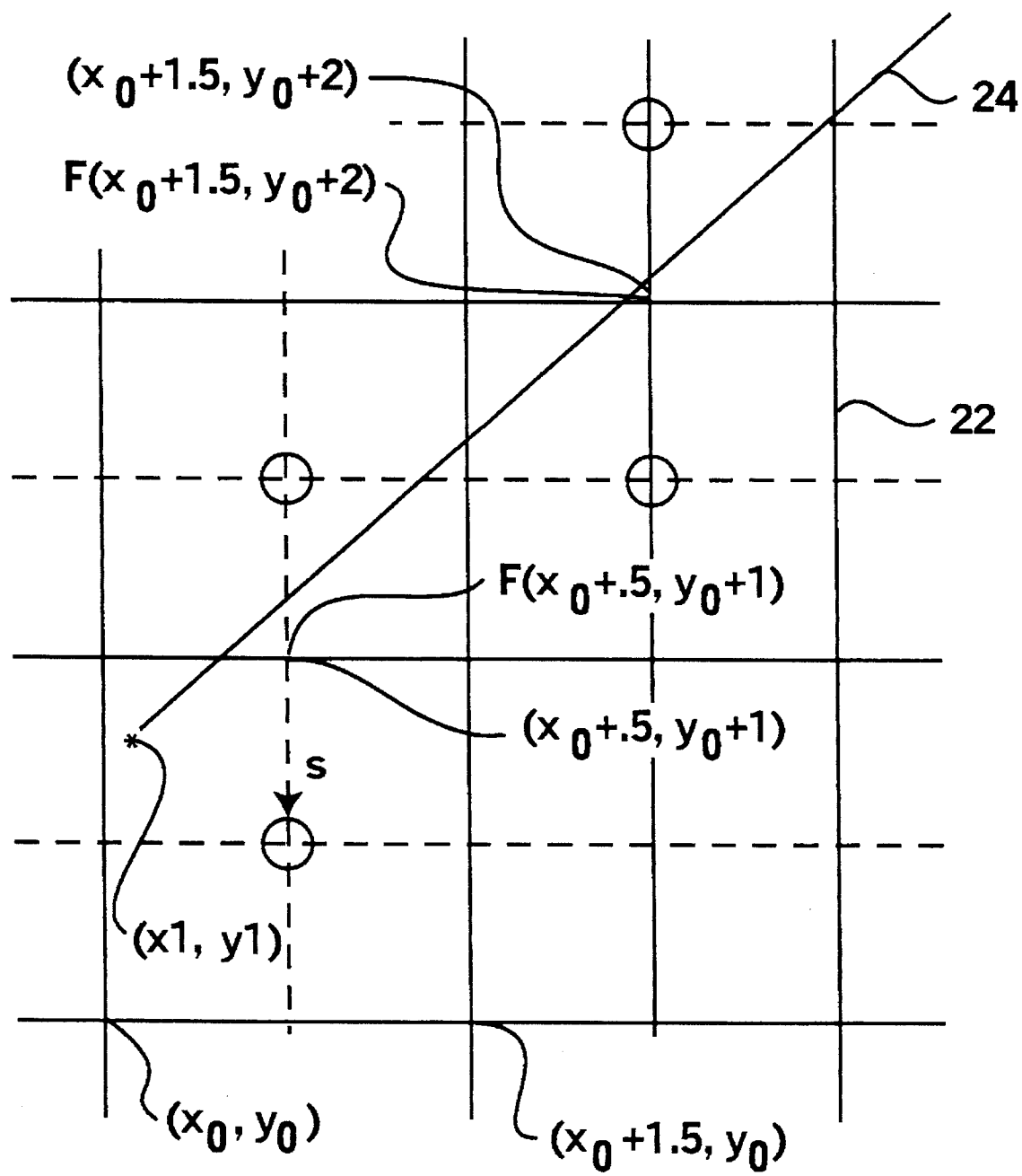
FIG. 3 is an illustration further demonstrating the calculation fractional endpoints.

Two possible scenarios for computing the next value of d are illustrated in FIGS. 2 and 3. As illustrated in FIG. 2, if E is negative, the line 20 starts at int(x1),int(y1) and the next sapling point is (x0+1.5,y0+1):

$$d1=2*F(x0+1.5,y0+1)=2*F(x0+0.5,y\ 0+1)+2*dy=d0+2*dy=3dy-2dx+2(dx*y1\_frac-dy*x1\_frac)$$

If E is positive, as illustrated in FIG. 3, the line 24 must still start at int(x1), int(y1), otherwise connected lines will not share endpoints, and the next sapling point is (x0+1.5,y0+2):

$$d1=2*F(x0+1.5,y0+2)=2*F(\ x0+0.5,y0+1)+2*dy-2*dx=d0+2*dy-2*dx=3dy-4dx+2(dx*y1\_frac-dy*x1\_frac)$$

The pixel coverages for the endpoint points are functions of s and of the fractional part of the coordinates of the endpoints. This results in the computation of a triple integral, having as support the 2D domain covered by the respective endpoint. A simplified analytic formula for endpoint coverage is provided in Appendix A hereto. The state machine code for computing fractional endpoint lines with endpoint correction, and with angle compensation, is also provided in Appendix A.

Figure 4:
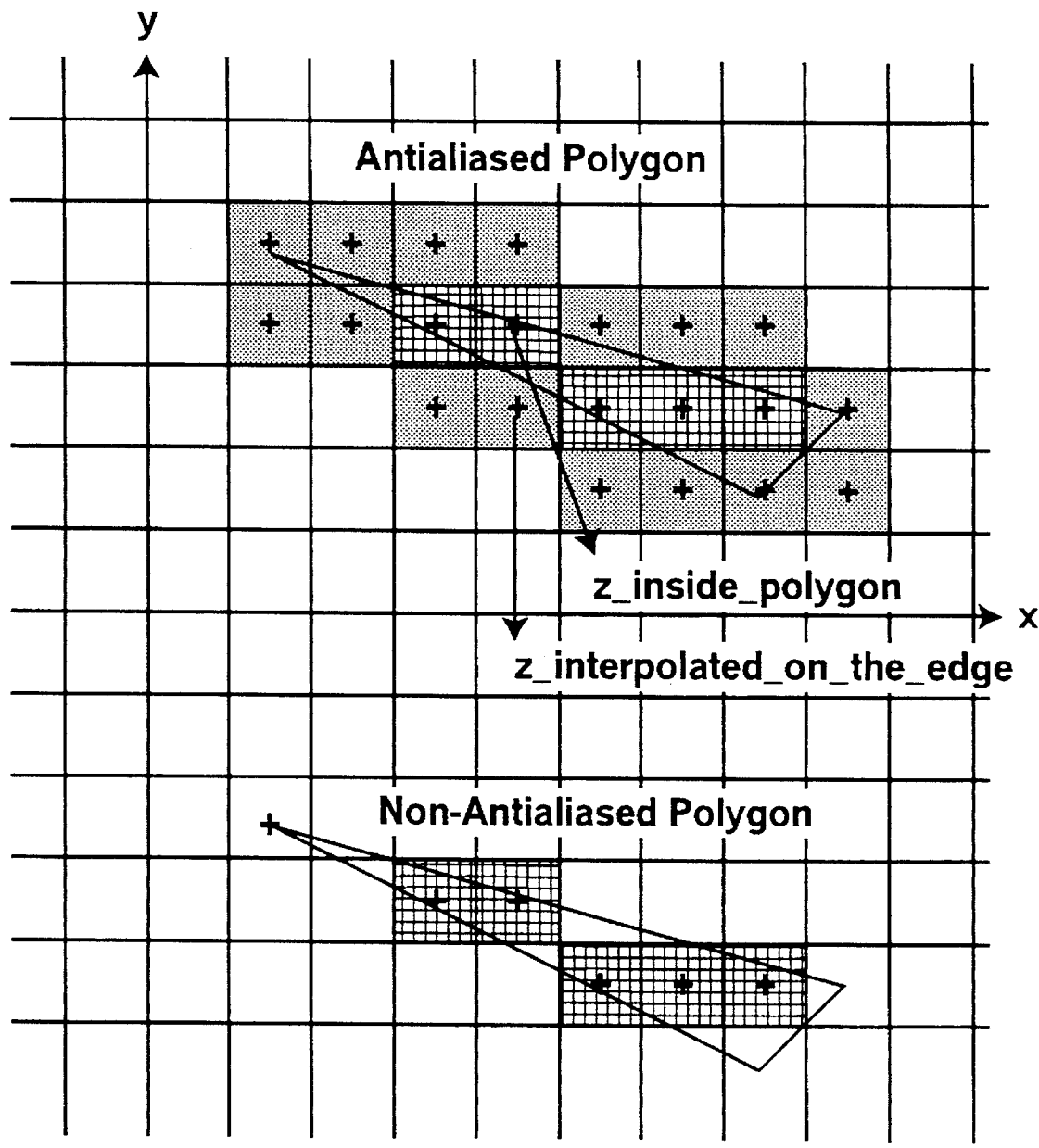
FIG. 4 is an illustration demonstrating application of the present invention to polygonal images.

Having now described various antialiased line drawing techniques, it is important to note that many graphics applications make greater use of antialiased polygon drawing techniques than they make use of line drawing techniques. Therefore, a preferred embodiment of the above techniques relates to the antialiasing of polygon edges. While polygon edges, as known in the art, can be antialiased using accumulation buffers, this method tends to be computationally intensive. A less expensive way of antialiasing polygon edges is by retracing them with an antialiased line in accordance with the present invention. As is illustrated in FIG. 4, this embodiment modifies the previously described line drawing processes as follows, such that only the pixel positioned outside the polygon is actually rendered, thereby avoiding the error of altering the original polygon:

```
e1=dy/dx
incr1=2dy
incr2=2(dy–dx)
s=y1_frac–0.5+e1(0.5–x1_frac)
z=z1+dz/dx*(.5–x1_frac)+dz/dy*(.5–v1_frac)
rgb=rgb1+drgb/dx*(.5–x1_frac)+drgb/dy*(.5–y1_frac)
sdx=s*2dx=dy–dx+2(dx*y1_frac–dy*x1_frac)
E=3dy–4dx+2(dx*y1_frac–dy*x1_frac)=d–2dx
d=3dy–2dx+2(dx*y1_frac–dy*x1_frac)
If E>0 Then                              //d for second pixel needs to be//
                                         // adjusted//
Begin                                    //only if E>0//
    d=d–2*dx=E                           //adjust d//
End
For i=1 to dx Do
Begin
    If d<0 Then
    Begin
        x=x+incrx1
        y=y+incry1
        d=d+incr1
        s=s+e1
        sdx=sdx+incr1
        z=z+dz/dx*incrx1+dz/dy*incry1
        rgb=rgb+drgb/dx*incrx1+drgb/dy*incry1
    End Else
    Begin
        x=x+incrx2
        y=y+incry2
        d=d+incr2
        s=s+e2
        sdx=sdx+incr2
        z=z+dz/dx*incrx2+dz/dy*incry2
        rgb=rgb+drgb/dx*incrx2+drgb/dy*incry2
    End
    If sdx>0 Then
    Begin
        Coverage_T=aa_table(s)
        Write_pixel(x,y+1,z,Coverage_T,rgb)
    End Else
    Begin
        Coverage_T=aa_table(1–s)
        z=z–dz/dy                        //adjust z to correspond to S//
        Write_Pixel(x,y,z,Coverage_T,rgb)
    End
    Procedure Write_Pixel(x,y,z,alpha,rgb)
    Begin
        If z=z_buffer Then
        Begin
            rgb=alpha*rgb+(1+alpha)*rgb_buffer
            Write(x,y,rgb)               //replace the color//
            Write(x,y,z)                 //replace z//
        End
End
```

In accordance with the above-described process, the pixel inside the polygon is not rendered, thus avoiding overwriting it. This very precise inside/outside test for polygon rendering based on characteristic functions allows this embodiment of the present invention to render polygons that do not overlap the antialiasing edges.

The method for treating polygon meshes is somewhat different. A 3D polygon mesh is antialiased by retracing each edge in the edge list after the whole mesh has been rendered. Using this technique will result in no artifacts being generated along the shared edges of a smoothly shaded mesh because the technique recovers the original color of the pixel. However, each pixel along the edge is blended according to the formula:

If $z \leq z\_buffer$, Then

New_color$(x,y,z)$=alpha*AA_edge$(x,y,z)$+(1-alpha)*Old_color$(x,y,z)$ where AA_edge(x,y,z) is the antialiasing pixel belonging to one of the two polygons sharing the edge. The antialiasing pixel will overlap with the pixel Old_color(x,y,z) located inside the other polygon sharing the edge. Where the antialiasing edge overlaps polygons belonging to the same mesh, AA_edge(x,y,z)=Old_color(x,y,z) because both represent the same pixel location interpolated with the same shading algorithm. This is due to the fact that the antialiasing edge inherits the z value, the texturing and the shading formula belonging to the retraced edge. This is accomplished by interpolating z along the semi-line inside the polygon and by interpolating the color and the texture along the semi-line located outside the polygon as shown in FIG. 4. For a clockwise polygon, "outside" translates into generating the pixel "above" the line (pixel T) for edges situated in octants 1, 3, 5, 7, and into generating the pixel "below" the line (pixel S) for octants 2, 4, 6, 8, where octant 1 is the octant between the positive x-axis and the 45 degree line. This convention needs to be reversed for polygons that are traced counterclockwise.

It follows that New_color=Old_color, i.e. the pixels along the internal edges are undisturbed by the antialiasing algorithm. In all the other places, AA_edge(x,y,z) will blend with the background (generating an antialiased silhouette) or with polygons belonging to other objects generating a blending between the objects. Antialiasing edges that loose out in the z-comparison (because they are attached to a polygon edge that lost in the z-comparison) are not rendered, thus avoiding any color bleeding through from already obscured polygons.

The state machine code for antialiasing 3D polygon edges is presented in Appendix B. For reasons of brevity, only octants 1, 3, 5, 7 are shown.

Although the present invention has so far been described in terms of method steps required to carry out the various processes described above, it is to be understood that the processes of the present invention are preferably carried out in an apparatus which provides for a hardware implementation. While a general purpose processor could be utilized under software control to carry out the present invention, or a general purpose computer combined with a limited amount of hardware, more hardware is preferred over less hardware because of the greater speeds that can be achieved in a hardware implementation, and because specialized hardware frees the general purpose processor up for other purposes.

Figure 5:
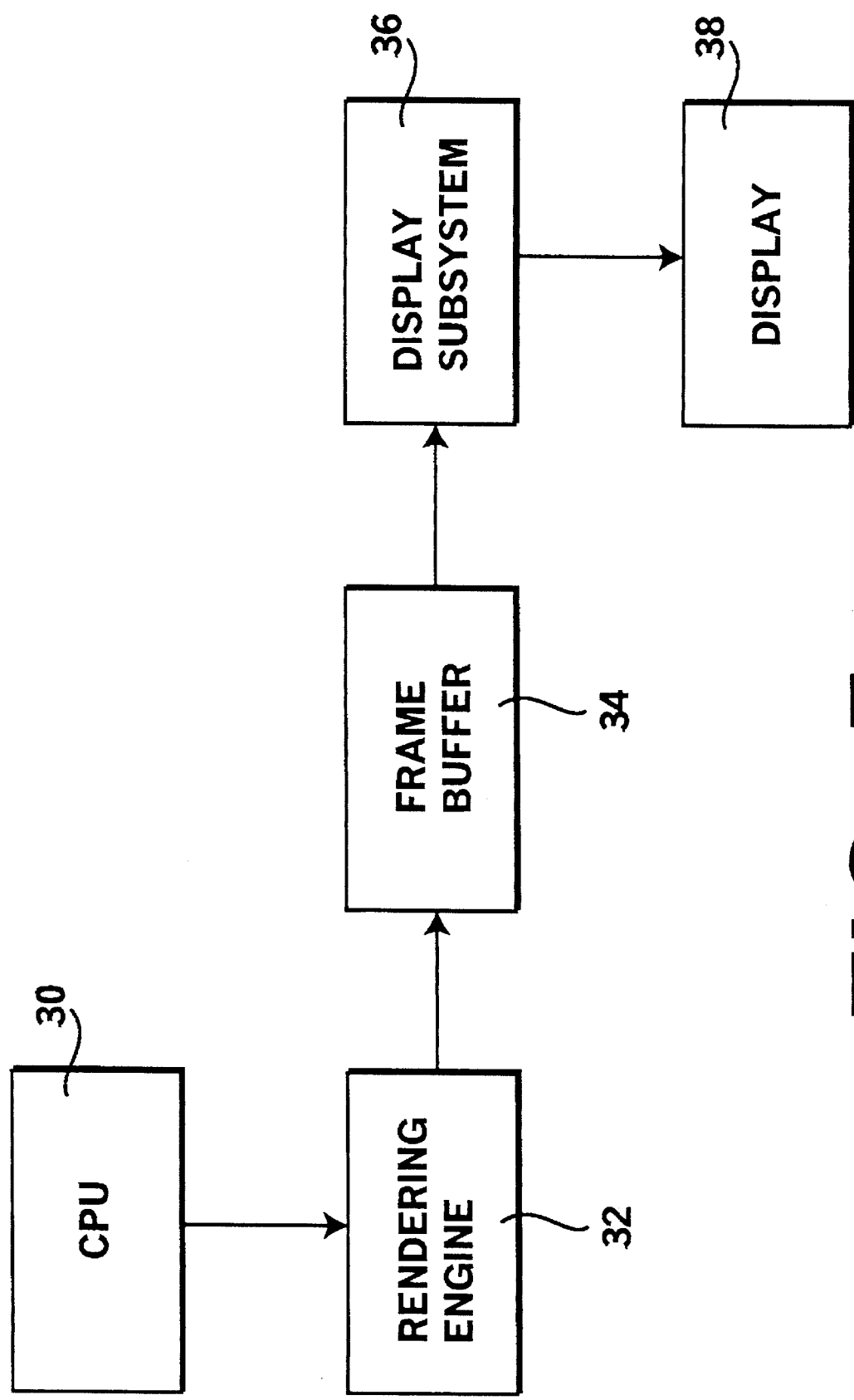
FIG. 5 is a block diagram illustrating a graphics display system for preferred implementation of the present invention.

FIG. 5 is a block diagram illustrating the general components of this apparatus, such as one of the previously described computer systems. A central processing unit (CPU) 30 is connected to a rendering engine 32, which converts geometric data processed by the CPU 30 into pixel and line data that the rendering engine then writes into the frame buffer 34. Pixel data typically includes at least X and Y screen coordinates, plus a number of parameters, such as red (R), green (G) and blue (B) color values, and alpha (A) values if alpha blending is supported. On occasion, the CPU may also output setup data, as discussed below, when a context switch occurs which causes the rendering of another image. In the present embodiment, CPU 30 outputs the X and Y screen coordinates for the start point and end point of the line to be drawn and the value "color" and "color_delta." The frame buffer 34 is typically a VRAM (Video RAM) which contains pixel color and overlay data for the display 38, as well as clipping ID planes for use during arbitrary window clipping operations. The display subsystem 36 receives the output of the frame buffer 34 and generates RGB video signals for output to the display 38.

Figure 6:
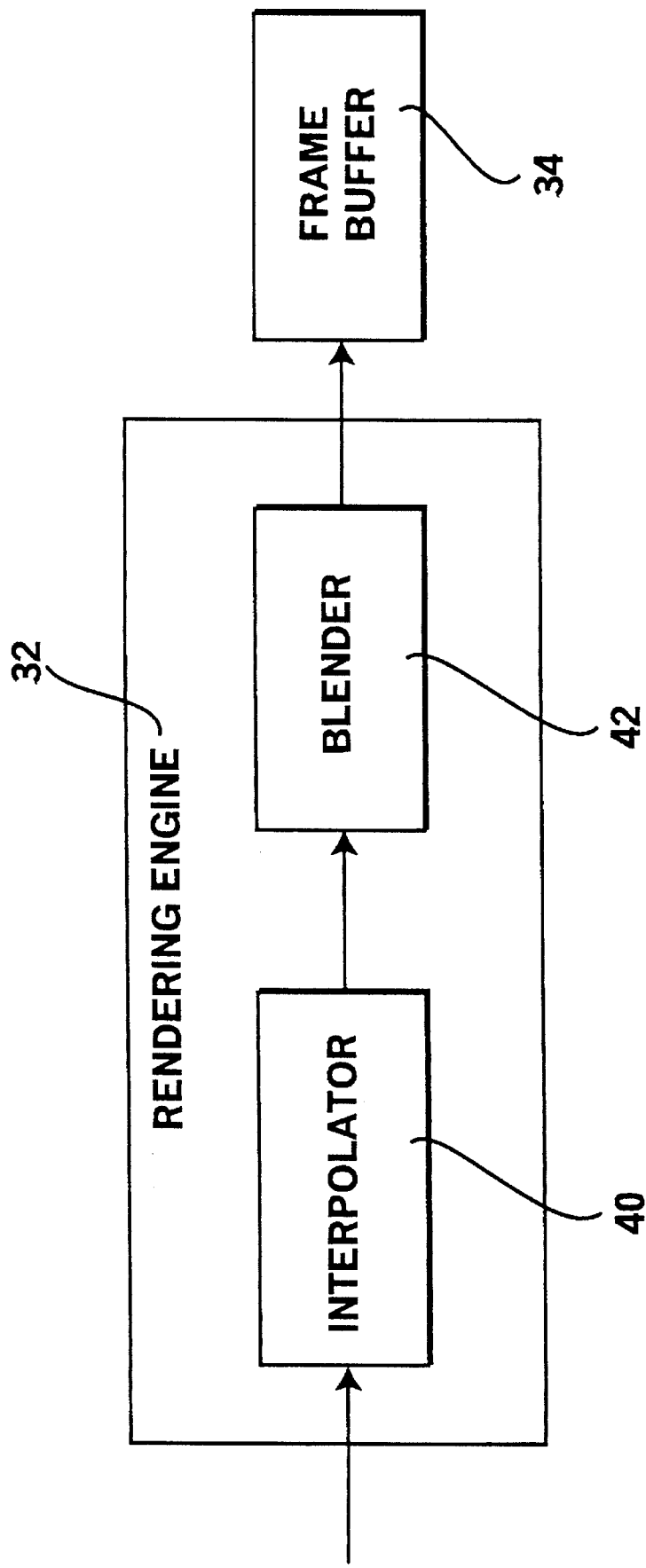
FIG. 6 is a block diagram further illustrating the rendering engine of FIG. 5.

The rendering engine 32 is further illustrated in FIG. 6 as being comprised of an interpolator 40 and a blender 42. The interpolator 40 is further illustrated in FIG. 7 as being comprised of a setup unit 44 and an iterator unit 46. The setup unit 44 receives the X and Y screen coordinates for the start point and the end point from the CPU 30. The setup unit 44 then calculates the initial setup data (parameter values), based on the X and Y coordinates and certain known characteristics of the display, for use by the iterator unit 46. The setup unit 44 is further illustrated in FIG. 8, which shows that the coordinates for the start point and end point are received by a subtracter 48, which subtracts the X and Y coordinates of the start point from the end point. The remainders (dy and dx) of the subtraction are output to the comparator 50, which compares the signs of the remainders, as well as the absolute values of the remainders, to determine the octant of the line to be drawn.

Figure 7:
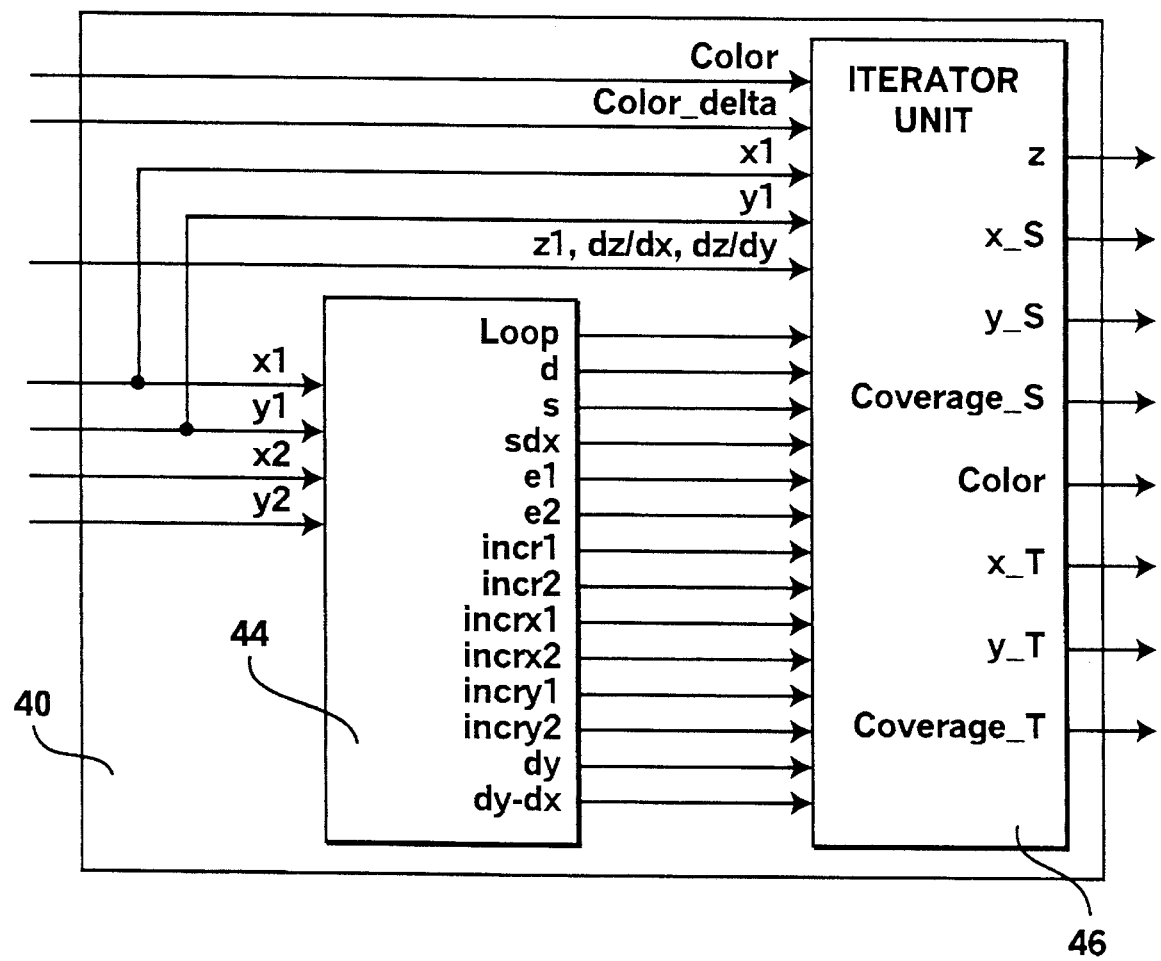
FIG. 7 is a block diagram further illustrating the interpolator of FIG. 6.
Figure 8:
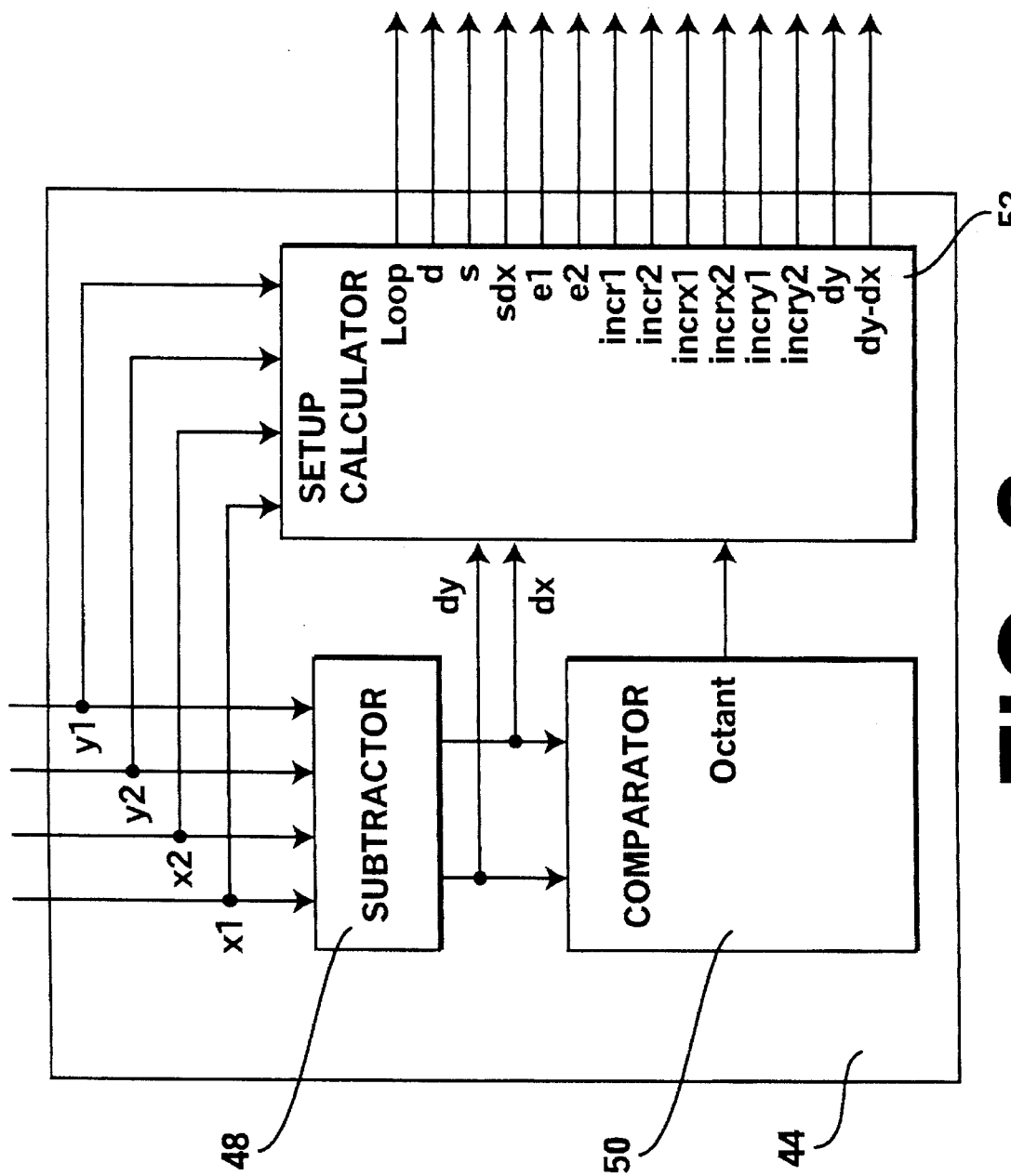
FIG. 8 is a block diagram further illustrating the setup unit of FIG. 7.
Figure 9:
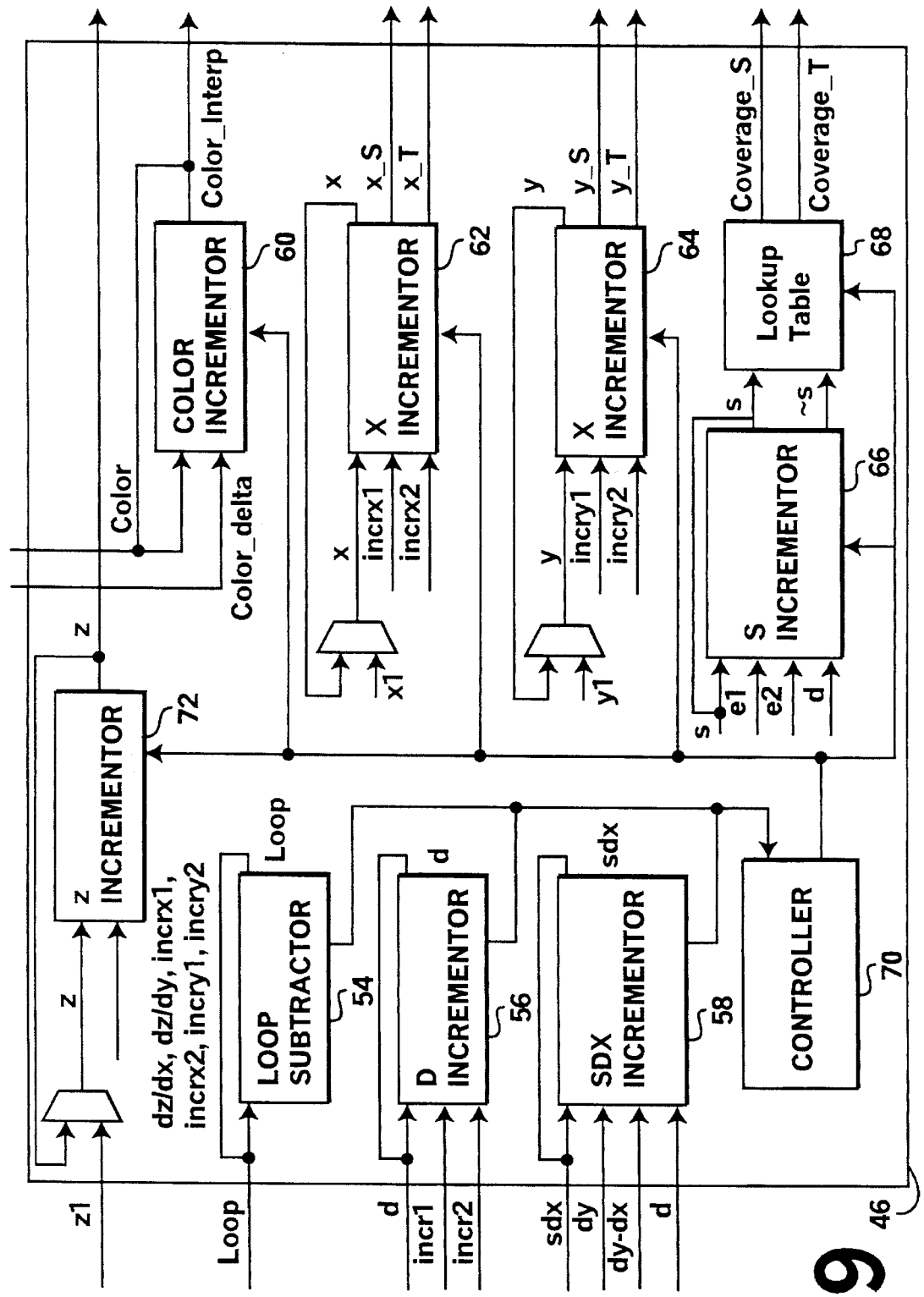
FIG. 9 is a block diagram further illustrating the iterator unit of FIG. 7.

The octant is output to the setup calculator 52, which also receives dy, dx from the subtracter 48, and the X and Y coordinates of the start point and end point. The setup calculator then computes the parameter values loop, d, s, sdx, e1, e2, incr1, incr2, incrx1, incrx2, incry1, incry2, dy and dy-dx. These parameter values are output to the iterator unit 46 of FIG. 7, which also receives the values color and color_delta from the CPU 30. The iterator unit 46 uses these inputs to compute the coordinates of the two or three pixels comprising each iteration of the line, as well as the coverages and colors of those pixels. FIGS. 7 and 9 illustrate the function and operation of the iterator unit 46 for computing a two pixel wide line in accordance with the present invention. Naturally, if only a single pixel was required to be computed for a particular application, such as rendering a filed polygon, only a portion of the iterator would be utilized.

In FIG. 9, the iterator unit 46 is shown as being comprised of an incremental loop subtracter 54, a d incrementor 56, a sdx incrementor 58, a color incrementor 60, a X incrementor 62, a Y incrementor 64, and an s incrementor 66. A lookup table 68 is connected to the output of the s incrementor 66 for retrieval of the pixel coverages as previously discussed. A controller 70 is also provided to receive the outputs of the loop subtracter 54, the d incrementor 56 and the sdx incrementor 58, and to use that information to control the operation of the remaining incrementors and the lookup table 68. As is partially illustrated by additional inputs in FIG. 7, a Z incrementor 72 receives z1, dz/dx, and dz/dy from the CPU 30 and incrx1, incrx2, incry1 and incry2 from the set up unit 44. Like the other incrementors, the Z incrementor uses its various inputs to calculate a particular output, in this case the value Z, under the control of controller 70.

Figure 10:
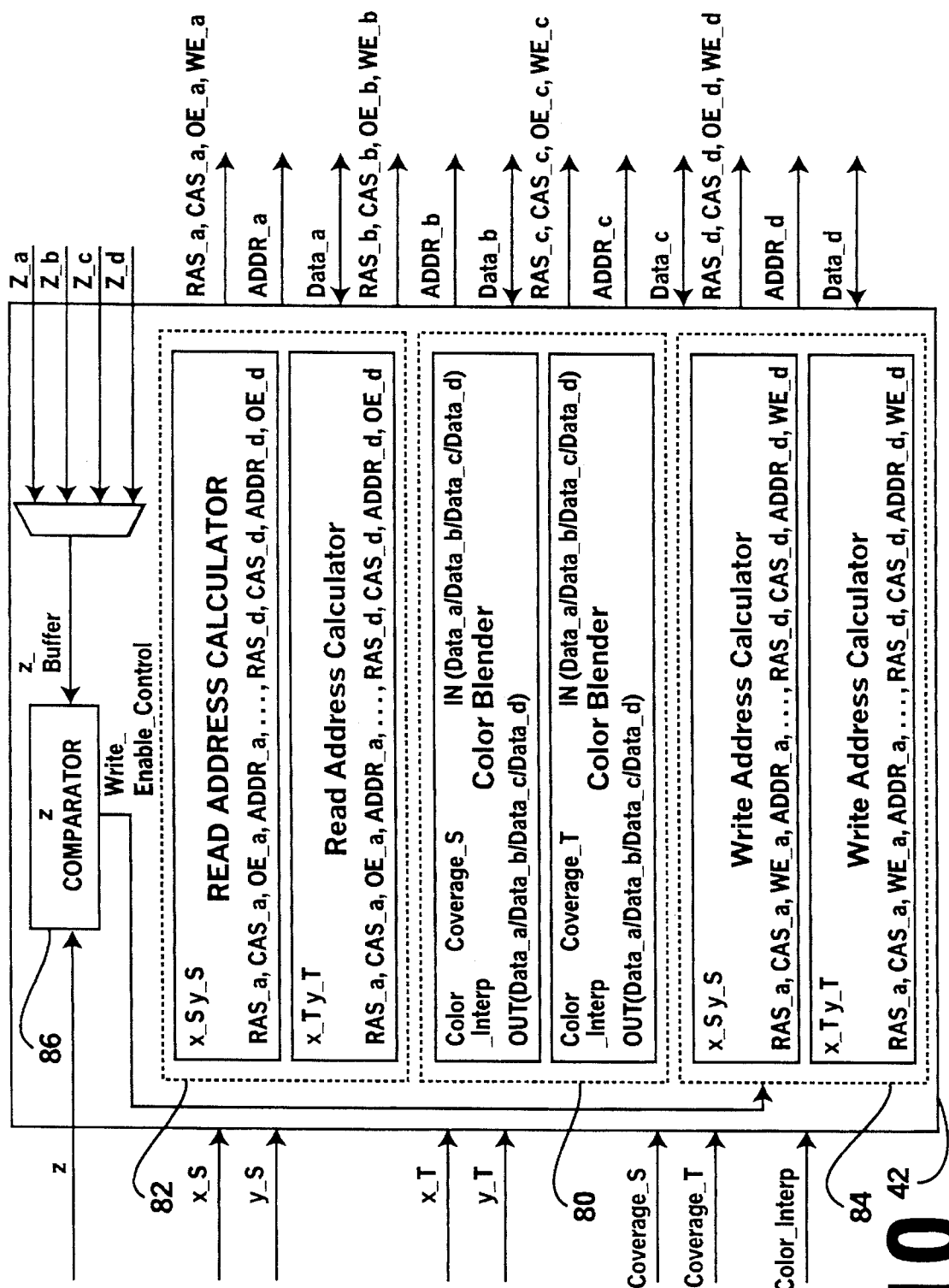
FIG. 10 is a block diagram further illustrating the blender of FIG. 6.
Figure 11:
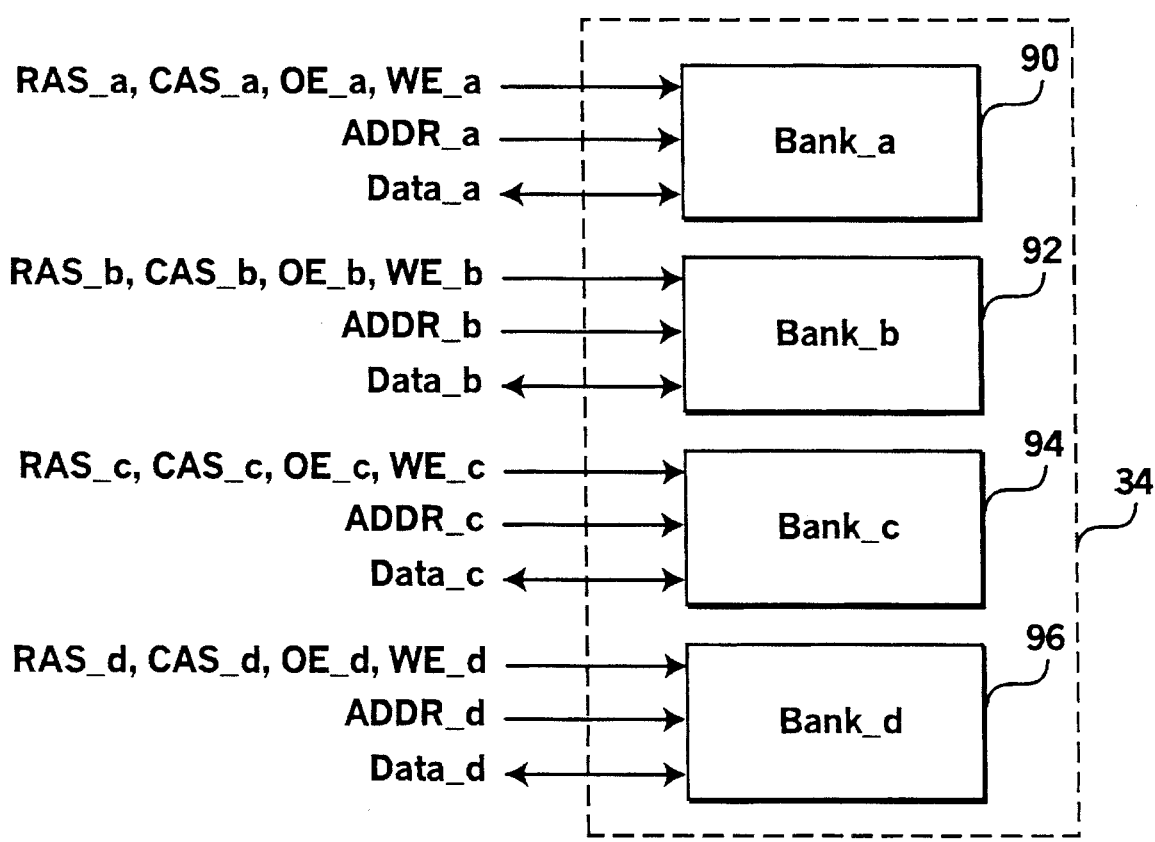
FIG. 11 is a block diagram further illustrating the frame buffer of FIGS. 5 and 6.

The output of the iterator unit 46 is then received by the blender 42, which is further illustrated in FIG. 10. The blender 42 operates to perform a number of functions. One function, when alpha blending is utilized, is to determine the color of a present pixel in view of any underlying pixel which may be allowed to leak through because of the opacity of the present pixel. The blender 42, the operation of which is well known in the art, is particularly useful when antialiased lines are to be rendered against a background that is not black, or where one antialiased line crosses another antialiased line, because the blender 42 can make background corrections that preserve the antialiased appearance of each of the rendered lines.

The other function, which is independent of alpha blending, is to determine the row address strobe (RAS), column address strobe (CAS), output enable (OE), write enable (WE), frame buffer bank address and pixel data values for each pixel to be written into one of four or more banks of the frame buffer as a result of the above described iterative process. Since the above process computes the coverage of two to three pixels at each iteration, some mechanism must be provided for those coverage values to be written into the frame buffer simultaneously.

For the case of a two pixel wide line, both coverages are computed simultaneously through the use of the lookup table 68, by addressing the table with s and s-bar (the one's complement of s). Thus, while s is picking up the S-pixel coverage from the table, s-bar is picking up the T-pixel coverage from the same table. The two color blender units 80 of the blender 42 allow colors to be assigned to the pixels simultaneously, and the dual read address calculators 82 and write address calculators 84 allow both coverages and colors to be written into the frame buffer memory 34 simultaneously. In order to make such frame buffer write access possible, the frame buffer is split into multiple banks and subbanks amongst a multiple of semiconductor chips.

In addition, the blender 42 includes a Z comparator 86. A mux is used as part of the comparator to mux the Z portion of the RGBZ data signals output by the frame buffer 34 (represented as Z_a, Z_b, Z_c, Z_d) to derive the Z_buffer signal for input to the Z_comparator. Z buffer is then compared to Z, resulting in the output of write enable control, which is used as an input to the Write Address Calculators 84 to produce the write enable signal for Banks a, b, c, d of frame buffer memory 34.

Figure 12:
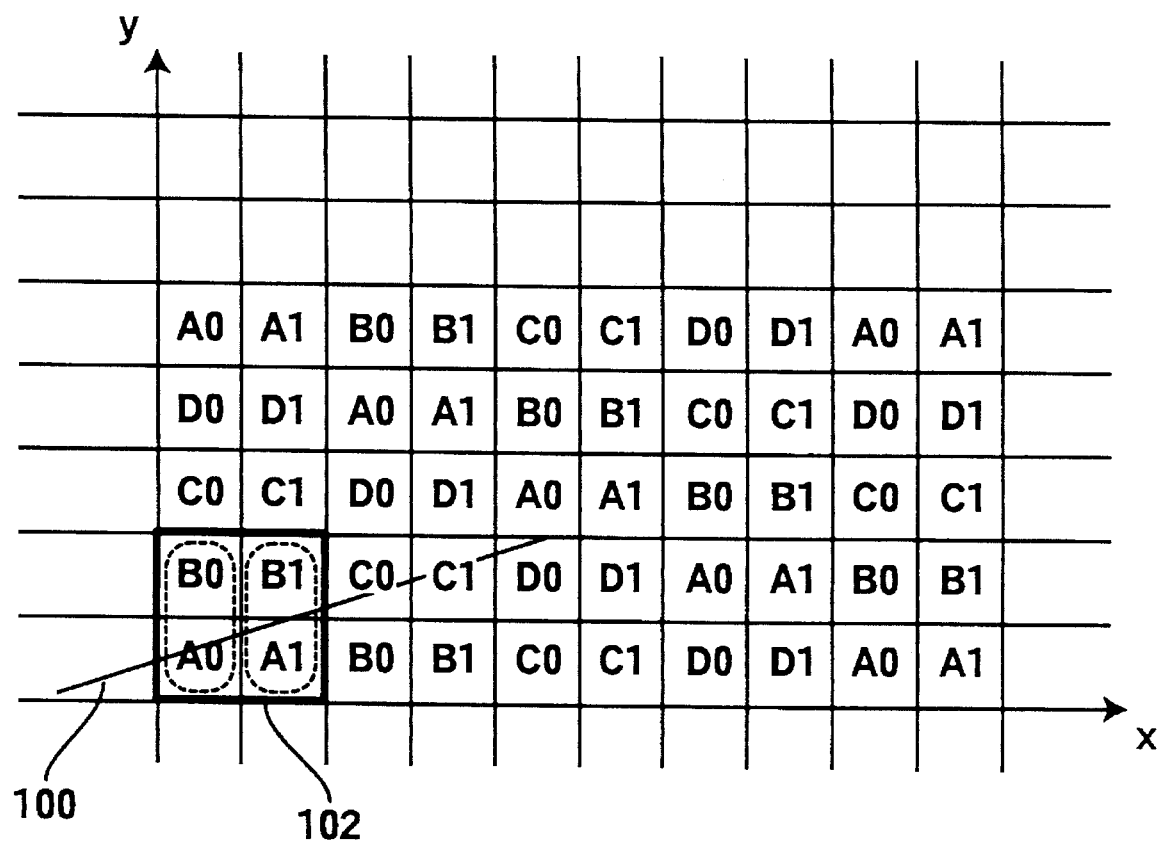
FIG. 12 is an illustration demonstrating the assignment of pixel data to various subbanks in the frame buffer of FIG. 11.

Although the frame buffer 34 could be split into any number of even number banks, in the present embodiment, a total of four banks are utilized. Each of these banks (A, B, C and D, as indicated in FIG. 12) is located on a separate semiconductor memory chip, where it is split into two subbanks (0 and 1). It should be noted, however, that the same chip could be used for two or more banks, provided the chip was truly multi-ported (including multiple sets of controls). The layout of the frame buffer assures that the memory bank selection scheme will always result in the two pixels selected at each iteration being written into different subbanks, regardless of the slope of the line to be drawn or the vertical or horizontal position of the pixels to be selected. For example, with respect to line 100, four different subbanks are used to write the pixels in the area 102. Again, naturally, if only a single pixel is required to be rendered, such as when rendering a polygonal image, the frame buffer 34 would not need be required to simultaneously store multiple pixels.

A mathematical model for calculating the subbank of a pixel is next described. Although this model also portrays a physical layout for the frame buffer 34, many different hardware implementations of this basic model could be utilized. For every given X and Y value, the three least significant bits of X are extracted and the 2 least significant bits of Y are extracted. As a result, there are eight possible values of X and four possible values of Y. The possible values of Y are designated YY. A value for X, designated as XXX is then computed by taking the possible values of X and adding in binary (and ignoring the final carry bit) either a 0, 2, 4 or 6. Thus, if YY=00, add 000 to the three least significant X bits, if
YY=01, add 010 to the three least significant X bits, if
YY=10, add 100 to the three least significant X bits, and if
YY=11, add 110 to the three least significant X bits.

For example, if Y=15 and X=23, then Y would be 1111 in binary with 11 as the two least significant bits. Likewise, X would be 10111 in binary with 111 as the three least significant bits. Since YY=11, then 110 would be added in binary to the three least significant bits of X, resulting in $$\begin{array}{r} 111 \\ + \, 110 \\ \hline 101 \end{array}$$ (ignoring the final carry bit)

After calculating XXX, the bank can be determined by looking at the first 2 most significant bits of XXX and the subbank can be determined by looking at the least significant bit of XXX. The possible values of XXX and the corresponding banks and subbanks are therefore as follows:

| XXX | Bank | Subbank |
|-----|------|---------|
| 000 | A | 0 |
| 001 | A | 1 |
| 010 | B | 0 |
| 011 | B | 1 |
| 100 | C | 0 |
| 101 | C | 1 |
| 110 | D | 0 |
| 111 | D | 1 |

Since the iterator can iterate more than one pixel per iteration and differently controllable subbanks of the frame buffer can be used for each of the pixels making up a line at each iteration, it is possible to perform memory access at about twice the speed previously possible, given that 2 pixels can be written per iteration and an iteration occurs every 60 nsec.

In this disclosure, there is shown and described only the preferred embodiment of the present invention, but it is to be understood that the invention is capable of use in various other combinations and environments and is capable of changes and modifications within the scope of the inventive concept as expressed herein. In particular, while the present invention is primarily described as being implemented in hardware, this does not preclude the invention's implementation in software or some other combination of hardware and software.

Appendix A: Code for antialiased line with fractional endpoints and angle compensation, with endpoint filtering.

```
Procedure Write_Pixel(x,y,alpha)
                        // 0=< alpha<=1 due to looking it up in aa_table //
    global variable: new_color
                        //new_color is the current drawing color//
Begin
    Read_Framebuffer(x,y,bckg_color)
                        //read the background color at location (x,y)//
    color=alpha*new_color + (1-alpha)*bckg_color
                        // alpha represents pixel coverage//
    Write_Framebuffer(x,y,color)
                        //write back the resultant of blending to (x,y)//
End Procedure GL_AAE_Bresenham(x1,y1,x2,y2,e1,c1)

fixed: x1,y1,x2,y2,e1    //CPU computes the octant//
aray: aa_table0 (s,e1), aa_table1(1-s,e1)
                        // This array is a function of slope and is//
                        //indexed with s//
integer: Octant,x10,y10,x20,y20
integer: x_major        //x_major=1 in octants 1,4,5,8 //
                        //e1=dy/dx for x-major. e1=dx/dy for y-major//
                        //where dx=ABS(x1-x2) and dy=ABS(y1-y2)//

//Compute the octant-independent values//
e2=e1-1.0
x10=int(x1), y10=int(y1)//RASTER ENGINE computes the fixed->int and
the d term//
x20=int(x2), y20=int(y2)
x=x10, y=y10
dx=ABS(x1-x2), dy=ABS(y1-y2)
dx_i=ABS(x10-x20)-1, dy_i=ABS(y10-y20)-1

Case Octant of (x2-x1,y2-y1,dx-dy):

1:  d=3dy-2dx,incr1=2dy,incr2=2(dy-dx),Loop=dx_i
        //compute the octant-dependent values//
        incrx1=1,incrx2=1,incry1=0,incry2=1,x_major=1

2:  d=3dx-2dy,incr1=2dx,incr2=2(dx-dy),Loop=dy_i
        //compute the octant-dependent values//
```

```
            incrx1=0,incrx2=1,incry1=1,incry2=1,x_major=0
            temp=x1_fract
            x1_fract=y1_fract
            y1_fract=temp
            temp=x2_fract
            x2_fract=y2_fract
            y2_fract=temp
            temp=dx
            dx=dy
            dy=temp 3:      d=3dx-2dy,incr1=2dx,incr2=2(dx-dy),Loop=dy_i
            //compute the octant-dependent values//
            incrx1=0,incrx2=-1,incry1=1,incry2=1,x_major=1
            temp=1-x1_fract    //use 1-x_fract left of y-axis//
            x1_fract=y1_fract
            y1_fract=temp
            temp=1-x2_fract    //use 1-x_fract left of y-axis//
            x2_fract=y2_fract
            y2_fract=temp
            temp=dx
            dx=dy
            dy=temp 4:      d=3dy-2dx,incr1=2dy,incr2=2(dy-dx),Loop=dx_i
            //compute the octant-dependent values//
            incrx1=-1,incrx2=-1,incry1=0,incry2=1,x_major=0
            x1_fract=1-x1_fract//use 1-x_fract left of y-axis//
            x2_fract=1-x2_fract 5:      d=3dy-2dx,incr1=2dy,incr2=2(dy-dx),Loop=dx_i
            //compute the octant-dependent values//
            incrx1=-1,incrx2=-1,incry1=0,incry2=-1,x_major=1
            x1_fract=1-x1_fract//use 1-x_fract left of y-axis//
            y1_fract=1-y1_fract//use 1-y_fract below of x-axis//
            x2_fract=1-x2_fract//use 1-x_fract left of y-axis//
            y2_fract=1-y2_fract//use 1-y_fract below of x-axis//

6:      d=3dx-2dy,incr1=2dx,incr2=2(dx-dy),Loop=dy_i
            //compute the octant-dependent values//
            incrx1=0,incrx2=-1,incry1=-1,incry2=-1,x_major=0
            temp=1-x1_fract
            x1_fract=1-y1_fract//use 1-y_fract below of x-axis//
            y1_fract=temp
            temp=1-x2_fract
            x2_fract=1-y2_fract//use 1-y_fract below of x-axis//
```

```
                y2_fract=temp
                temp=dx
                dx=dy
                dy=temp 7:      d=3dx-2dy,incr1=2dx,incr2=2(dx-dy),Loop=dy_i
                //compute the octant-dependent values//
 5              incrx1=0,incrx2=1,incry1=-1,incry2=-1,x_major=0
                temp=1-y1_fract   //use 1-y_fract below of x-axis//
                y1_fract=x1_fract
                x1_fract=temp
                temp=1-y2_fract   //use 1-y_fract below of x-axis//
                y2_fract=x2_fract
                x2_fract=temp
                temp=dx
                dx=dy
10              dy=temp 8:      d=3dy-2dx,incr1=2dy,incr2=2(dy-dx),Loop=dx_i
                //compute the octant-dependent values//
                incrx1=1,incrx2=1,incry1=0,incry2=-1,x_major=1
                y1_fract=1-y1_fract//use 1-y_fract below of x-axis//
                y2_fract=1-y2_fract 15      s=y1_frac-0.5+e1(0.5-x1_frac)       //s for the first pixel//
        sdx=2*s*dx=2[(y1_frac-0.5)dx+(0.5-x1_frac)dy]=dy-dx+2(dx*y1_fract-
        dy*x1_fract)
        // sdx=s*2dx is an infinitely precise number calculated for the first pixel //
        d=d+2(dx*y1_fract-dy*x1_fract)
        //adjust d due to fractional endpoints, this is d calculated for first pixel//

If SKIPFIRST=TRUE Then
        Begin
20              If sdx>0 Then     //Compute the coverage for the starting pixel//
                Begin
        //THIS BRANCH MAY BE EXECUTED ON THE HOST IFSKIPFIRST=TRUE/
                        Coverage_T=(y1_fr-1+c1/2)(1-x1_fr)+.5*e1(1-x1_fr)**2
                        //T has the smaller coverage//
                        Write_Pixel(x+incrx2*~x_major,y+incry2*x_major,Coverage_T)
                        Coverage_S=(1-x1_fr)*c1-Coverage_T
                        //S is below the line and has the larger coverage//
25                      Write_Pixel(x,y,Coverage_S)
                End  Else           // sdx<0 //
                Begin
                        Coverage_T=(y1_fr+c1/2)(1-x1_fr)+.5*e1(1-x1_fr)**2
                        //T has the larger coverage//
```

```
                    Write_Pixel(x,y,Coverage_T)
                    Coverage_S=(1-x1_fr)*c1-Coverage_T
                    //S is below the line and has the larger coverage//
                    Write_Pixel(x-incrx2*~x_major,y-incry2*x_major,Coverage_S)
            End
        End Else //SKIPFIRST=FALSE//
        Begin
            If sdx>0 Then    //Compute the coverage for the starting pixel//
            Begin
            // THIS CODE EXECUTED BY RASTER ENGINE BECAUSE SKIPFIRST=FALSE//
                    Coverage_T=aa_table(s_frac*(1-x1_fr))
                    //The coverages are inversely proportional with x1_fr//
                    Write_Pixel(x+incrx2*~x_major,y+incry2*x_major,Coverage_T)
                    Coverage_S=aa_table(~s_frac*(1-x1_fr))
                    //S is below the line and has the larger coverage//
                    Write_Pixel(x,y,Coverage_S)
            End Else    // sdx<0//
            Begin
                    Coverage_T=aa_table(~s_frac*(1-x1_fr))
                    //T has the larger coverage//
                    Write_Pixel(x,y,Coverage_T)
                    Coverage_S=aa_table(s_frac*(1-x1_fr))
                    //S is below the line and has the larger coverage//
                    Write_Pixel(x-incrx2*~x_major,y-incry2*x_major,Coverage_S)
            End
        End
        End // SKIPFIRST //
        E=d-2dx
        If E>0 Then
        //adjust d due to fractional endpoints, this is d for second pixel//
        Begin
                d=E
        End
        For i=1 to Loop-1 Do
        Begin
            If d<0 Then    // s<t, execute a horizontal step//
            Begin
                    x=x+incrx1    //advance to next pixel//
                    y=y+incry1
                    d=d+incr1    //compute new values for d and s//
                    s=s+e1
                    sdx=sdx+2dy=sdx+incr1
            End Else    // d>0 results into s>t>0, execute a 45 degree step//
            Begin            //45 degree move//
                    x=x+incrx2
```

```
                y=y+incry2
                d=d+incr2          //compute new values for d and s//
                s=s+e2             // this brings s back into the interval [-1,1] //
                sdx=sdx+2(dy-dx)=sdx+incr2
        End
        If sdx>0 Then
        Begin
5               Coverage_T=aa_table(s_frac)     // s_frac=Fraction(s) //
                Write_Pixel(x+incrx2*~x_major,y+incry2*x_major,Coverage_T)
                Coverage_S=aa_table(~s_frac)    //~s_frac=1-s_frac //
                Write_Pixel(x,y,Coverage_S)
        End Else
        Begin
                Coverage_T=aa_table(~s_frac)
                Write_Pixel(x,y,Coverage_T)
10              Coverage_S=aa_table(s_frac)
    21          Write_Pixel(x-incrx2*~x_major,y-incry2*x_major,Coverage_S)
        End
    End If SKIPLAST=TRUE Then
    //THIS CODE MAY BE EXECUTED ON THE HOSTIF SKIPLAST=TRUE//
    Begin
        If sdx>0 Then    //Compute the coverage for the ending pixel//
15      Begin            //Correct the endpoint(s) if start point <> end point//
        Coverage_S=(1+c1/2-y2_fr)x2_fr+.5*e1*x2_fr**2
                    //S is below and has the larger coverage//
        Write_Pixel(x,y,Coverage_S)
        Coverage_T=c1*x2fr-Coverage_S
                    //T is above the line and has the smaller coverage//
        Write_Pixel(x+incrx2*~x_major,y+incry2*x_major,Coverage_T)
        End Else         //sdx<0 //
20      Begin
        Coverage_S=(c1/2-y2fr)x2fr+.5*e1*x2fr**2
                    //S is below and has the smaller coverage//
        Write_Pixel(x-incrx2*~x_major,y-incry2*x_major,Coverage_S)
        Coverage_T=c1*x2_fr-Coverage_S
                    //T is above the line and has the larger coverage//
        Write_Pixel(x,y,Coverage_T)
        End
    End Else
25  Begin            //For SKIPLAST=FALSE RASTER ENGINE fill the last pixel/
        If d<0 Then      // s<t, execute a horizontal step//
        Begin
        x=x+incrx1       //advance to next pixel//
        y=y+incry1
```

```
            s=s+e1
            sdx=sdx+2dy=sdx+incr1
    End Else    // d>0 results into s>t>0, execute a 45 degree step//
    Begin                    //45 degree move//
            x=x+incrx2
            y=y+incry2
            s=s+e2       // this brings s back into the interval [-1,1] //
            sdx=sdx+2(dy-dx)=sdx+incr2
    End
    If sdx>0 Then   //The coverages are directly proportional with x2_fr//
    Begin
            Coverage_T=aa_table(s_frac*x2_fr)
            Write_Pixel(x+incrx2*~x_major,y+incry2*x_major,Coverage_T)
            Coverage_S=aa_table(~s_frac*x2_fr)
            Write_Pixel(x,y,Coverage_S)
    End Else
    Begin
            Coverage_T=aa_table(~s_frac*x2_fr)
            Write_Pixel(x,y,Coverage_T)
            Coverage_S=aa_table(s_frac*x2_fr)
            Write_Pixel(x-incrx2*~x_major,y-incry2*x_major,Coverage_S)
    End
    End //SKIPLAST//
    End
```

Appendix B: Code for antialiasing z-buffered, alpha-buffered, 3D-polygon edge with fractional endpoints.

```
Procedure Write_Pixel(x,y,z,alpha,rgb)
Begin
        If z<=z_buffer Then
        Begin
                rgb=alpha*rgb+(1-alpha)*rgb_buffer
                Write(x,y,rgb)  //replace the color//
                Write(x,y,z)    //replace z//
        End
End {Write_Pixel}

Procedure GL_AA_Bresenham_Edge(x1,y1,z1,I1,x2,y2,z2,I2,e1,dz/dx,dz/dy,dI/dx,dI/dy)
fixed: x1,y1,z1,I1,x2,y2,z2,I2,e1
//e1=dy/dx for x-major.  e1=dx/dy for y-major //
fixed: dz/dx,dz/dy,dI/dx,dI/dy
array: aa_table0(s)
// for antialiasing edges we may not need angle compensation //
integer: x_major          //x_major=1 in octants 1,4,5,8 //

//Compute the octant-independent values// e2=e1-1
x10=int(x1), y10=int(y1)
//REX3 computes the fixed->int and the d term//
x20=int(x2), y20=int(y2)
x=x1, y=y1
dx=ABS(x1-x2), dy=ABS(y1-y2)
dx_i=ABS(x10-x20)-1, dy_i=ABS(y10-y20)-1

Case Octant of (x2-x1,y2-y1,dx-dy):

1:      d=3dy-2dx,incr1=2dy,incr2=2(dy-dx),Loop=dx_i
                //compute the octant-dependent values//
                incrx1=1,incrx2=1,incry1=0,incry2=1,x_major=1

2:      d=3dx-2dy,incr1=2dx,incr2=2(dx-dy),Loop=dy_i
                //compute the octant-dependent values//
                incrx1=0,incrx2=1,incry1=1,incry2=1,x_major=0
                temp=x1_fract
                x1_fract=y1_fract
                y1_fract=temp
                temp=x2_fract
                x2_fract=y2_fract
```

```
         y2_fract=temp
         temp=dx       //swap the meanings of x and y//
         dx=dy
         dy=temp
         temp=dz/dx// swap the meanings of dz/dx and dz/dy //
         dz/dx=dz/dy
         dz/dy=temp
5        temp=dI/dx // swap the meanings of dI/dx and dI/dy //
         dI/dx=dI/dy
         dI/dy=temp 3:  d=3dx-2dy,incr1=2dx,incr2=2(dx-dy),Loop=dy_i
         //compute the octant-dependent values//
         incrx1=0,incrx2=-1,incry1=1,incry2=1,x_major=1
         temp=1-x1_fract    //use 1-x_fract left of y-axis//
10       x1_fract=y1_fract
         y1_fract=temp
         temp=1-x2_fract    //use 1-x_fract left of y-axis//
         x2_fract=y2_fract
         y2_fract=temp
         temp=dx
         dx=dy
         dy=temp
         temp=dz/dx// swap the meanings of dz/dx and dz/dy //
15       dz/dx=dz/dy
         dz/dy=temp
         temp=dI/dx // swap the meanings of dI/dx and dI/dy //
         dI/dx=dI/dy
         dI/dy=temp 4:  d=3dy-2dx,incr1=2dy,incr2=2(dy-dx),Loop=dx_i //compute the
         octant-dependent values//
         incrx1=-1,incrx2=-1,incry1=0,incry2=1,x_major=0
20       x1_fract=1-x1_fract//use 1-x_fract left of y-axis//
         x2_fract=1-x2_fract 5:  d=3dy-2dx,incr1=2dy,incr2=2(dy-dx),Loop=dx_i //compute the
         octant-dependent values//
         incrx1=-1,incrx2=-1,incry1=0,incry2=-1,x_major=1
         x1_fract=1-x1_fract//use 1-x_fract left of y-axis//
         y1_fract=1-y1_fract//use 1-y_fract below of x-axis//
25       x2_fract=1-x2_fract//use 1-x_fract left of y-axis//
         y2_fract=1-y2_fract//use 1-y_fract below of x-axis//

6:  d=3dx-2dy,incr1=2dx,incr2=2(dx-dy),Loop=dy_i //compute the
         octant-dependent values//
```

```
        incrx1=0,incrx2=-1,incry1=-1,incry2=-1,x_major=0
        temp=1-x1_fract
        x1_fract=1-y1_fract//use 1-y_fract below of x-axis//
        y1_fract=temp
        temp=1-x2_fract
        x2_fract=1-y2_fract//use 1-y_fract below of x-axis//
        y2_fract=temp
5       temp=dx
        dx=dy
        dy=temp
        temp=dz/dx// swap the meanings of dz/dx and dz/dy //
        dz/dx=dz/dy
        dz/dy=temp
        temp=dI/dx // swap the meanings of dI/dx and dI/dy //
        dI/dx=dI/dy
10      dI/dy=temp 7:  d=3dx-2dy,incr1=2dx,incr2=2(dx-dy),Loop=dy_i //compute the
        octant-dependent values//
        incrx1=0,incrx2=1,incry1=-1,incry2=-1,x_major=0
        temp=1-y1_fract   //use 1-y_fract below of x-axis//
        y1_fract=x1_fract
        x1_fract=temp
        temp=1-y2_fract   //use 1-y_fract below of x-axis//
15      y2_fract=x2_fract
        x2_fract=temp
        temp=dx
        dx=dy
        dy=temp
        temp=dz/dx// swap the meanings of dz/dx and dz/dy //
        dz/dx=dz/dy
        dz/dy=temp
20      temp=dI/dx // swap the meanings of dI/dx and dI/dy //
        dI/dx=dI/dy
        dI/dy=temp 8:  d=3dy-2dx,incr1=2dy,incr2=2(dy-dx),Loop=dx_i //compute the
        octant-dependent values//
        incrx1=1,incrx2=1,incry1=0,incry2=-1,x_major=1
        y1_fract=1-y1_fract//use 1-y_fract below of x-axis//
        y2_fract=1-y2_fract
25
d=d+2(dx*y1_fract-dy*x1_fract)   //adjust d due to fractional endpoints//
s=y1_fract-0.5+e1*(.5-x1_fract)
sdx=2[(y1_fract-0.5)dx+(.5-x1_fract)dy]=dy-dx+2(dx*y1_fract-dy*x1_fract)
z=z1+dz/dx*(.5-x1_frac)+dz/dy*(.5-y1_frac) //adjust the starting z to the
```

```
        centerpixel//
        I=I1+dI/dx*(.5-x1_frac)+dI/dy*(.5-y1_frac)  //adjust the starting I to the
        centerpixel//

If SKIPFIRST=TRUE Then
        Begin
          If sdx>0 Then    //Compute the coverage for the starting pixel//
 5        Begin// THE BOLD CODE MAY BE  EXECUTED ON THE HOST IF
          SKIPFIRST=TRUE//
            Coverage_T=(y1_fr-1+e1/2)(1-x1_fr)+.5*e1(1-x1_fr)**2   //T has the
            smaller                                  coverage//
            Write_Pixel(x+incrx2*~x_major,y+incry2*x_major,z,Coverage_T,I)
          End  Else              // sdx<0 //
          Begin
            Coverage_T=(y1_fr+e1/2)(1-x1_fr)+.5*e1(1-x1_fr)**2//T has larger
 10       coverage//
            z=z-dz/dy//adjust z to the pixel under T, i.e. S//
            Write_Pixel(x,y,z,Coverage_T,I)
          End
        End  Else
        Begin
          If sdx>0 Then    //Compute the coverage for the starting pixel//
          Begin       // THIS CODE  EXECUTED BY RASTER ENGINE BECAUSE
          SKIPFIRST=FALSE//
 15         Coverage_T=aa_table(s_frac*(1-x1_fr))    //T he coverages are inversely
          proportional with x1_fr//
            Write_Pixel(x+incrx2*~x_major,y+incry2*x_major,z,Coverage_T,I)
          End Else               // sdx<0//
            Coverage_T=aa_table(~s_frac*(1-x1_fr)) //T has the  larger coverage//
            Write_Pixel(x,y,z,Coverage_T,I)
          End
        End // SKIPFIRST //
        E=d-2dx
 20     If E>0 Then    //adjust d due to fractional endpoints, this is d for second
        pixel//
        Begin
             d=E
        End
        For i=1 to Loop-1  Do
        Begin
          If d<0 Then       // s<t, execute a horizontal step//
 25       Begin
             x=x+incrx1      //advance to next pixel//
             y=y+incry1
             d=d+incr1       //compute new values for d and s//
             s=s+e1
```

```
            sdx=sdx+2dy=sdx+incr1
                z=z+dz/dx*incrx1+dz/dy*incry1
                I=I+dI/dx*incrx1+dI/dy*incry1
        End Else        //s>t>0, execute a 45 degree step//
        Begin           //45 degree move//
          x=x+incrx2
          y=y+incry2
5         d=d+incr2
          s=s+e2
          sdx=sdx+2(dy-dx)=sdx+incr2
                z=z+dz/dx*incrx2+dz/dy*incry2
                I=I+dI/dx*incrx2+dI/dy*incry2
        End If sdx>0 Then
10      Begin
          Coverage_T=aa_table(s_frac)    // only the top pixel is antialiased //
          Write_Pixel(x+incrx2*~x_major,y+incry2*x_major,z,Coverage_T,I)
        End Else
        Begin
          Coverage_T=aa_table(~s_frac)   // only the top pixel is antialiased //
          z=z-dz/dy//adjust z to the pixel under T, i.e. S//
          Write_Pixel(x,y,z,Coverage_T,I)

15      End // If//
        End // For //

If SKIPLAST=TRUE Then //THIS CODE MAY BE EXECUTED ON THE
        HOSTIF SKIPLAST=TRUE//
        Begin
          If sdx>0 Then   //Compute the coverage for the ending pixel//
          Begin       //Correct the endpoint(s) if start point <> end point//
20          Coverage_T=c1*x2fr-Coverage_S//T is above the line and has the
        smaller                     coverage//
            Write_Pixel(x+incrx2*~x_major,y+incry2*x_major,z,Coverage_T,I)
          End Else              // sdx<0 //
          Begin
            Coverage_T=c1*x2_fr-Coverage_S//T is above the line and has larger
        coverage//
            z=z-dz/dy//adjust z to the pixel under T, i.e. S//
            Write_Pixel(x,y,z,Coverage_T,I)
25        End
        End Else
        Begin   //For SKIPLAST=FALSE RASTER ENGINE fills the last pixel //
          If d<0 Then     // s<t, execute a horizontal step//
          Begin
```

```
          x=x+incrx1        //advance to next pixel//
          y=y+incry1
          s=s+e1
          sdx=sdx+2dy=sdx+incr1
              z=z+dz/dx*incrx1+dz/dy*incry1
              I=I+dI/dx*incrx1+dI/dy*incry1
       End Else    // d>0 results into s>t>0, execute a 45 degree step//
5      Begin                //45 degree move//
          x=x+incrx2
          y=y+incry2
          s=s+e2  // this brings s back into the interval [-1,1] //
          sdx=sdx+2(dy-dx)=sdx+incr2
              z=z+dz/dx*incrx2+dz/dy*incry2
              I=I+dI/dx*incrx2+dI/dy*incry2
       End
10     If sdx>0 Then   //The coverages are directly proportional with x2_fr//
       Begin
         Coverage_T=aa_table(s_frac*x2_fr)
         Write_Pixel(x+incrx2*~x_major,y+incry2*x_major,z,Coverage_T,I)
       End Else
       Begin
         Coverage_T=aa_table(~s_frac*x2_fr)
         z=z-dz/dy//adjust z to the pixel under T, i.e. S//
         Write_Pixel(x,y,z,Coverage_T,I)
15     End
       End //SKIPLAST//
       End {main}
```

We claim:

1. A method for drawing a one pixel wide antialiased line on an edge of a filled polygon, the antaliased line having a start point and an end point on a display of a computer having a memory for storing a color value for a pixel before outputting the color value to the display, comprising the steps of:

(a) selecting a first pixel closest to an idealized line between the start point and the end point and claimed by the edge of the polygon as a filled pixel;

(b) selecting a second pixel adjacent to the first pixel, the first pixel and the second pixel forming a pair of pixels straddling the idealized line;

(c) determining a coverage for the second pixel as a function of a value of a distance between the idealized line and the second pixel;

(d) determining an intensity for the second pixel as a function of the coverage;

(e) writing a color value into the memory for said second pixel based on the intensity of the second pixel;

(f) outputting the color value for said second pixel to the display; and (g) repeating steps (a) through (f) until color values for each of a plurality of second pixels between the start point and the end point have been output to the display.

2. The method as recited in claim 1, wherein the first pixel closest to the idealized line for a first pair of pixels is a first pixel closest to the start point and wherein the first pixel closest to the idealized line for a last pair of pixels is a first pixel closest to the end point.

3. The method as recited in claim 2, wherein for said first pixel closest to said end point, step (c) includes the step of determining said coverage by locating an entry in a look-up table of said memory indexed by said value of a distance between the idealized line and the second pixel, wherein said entry is a function of a slope of the idealized line and a width of the idealized line, and wherein said entry is multiplied by a fractional component of a coordinate of said end point.

4. The method as recited in claim 2, wherein for said first pixel closest to said start point, step (c) includes the step of determining said coverage by locating an entry in a look-up table of said memory indexed by said value of a distance between the idealized line and the second pixel, wherein said entry is a function of a slope of the idealized line and a width of the idealized line, and wherein said entry is multiplied by a one's complement of a fractional component of a coordinate of said start point.

5. The method as recited in claim 1, wherein step (c) includes the step of determining said coverage by locating an entry in a look-up table of said memory indexed by said value of a distance between the idealized line and the second pixel, and wherein said entry is a function of a slope of the idealized line and a width of the idealized line.

6. The method as recited in claim 1, wherein step (c) includes the step of determining said coverage by locating an entry in a look-up table of said memory indexed by a one's complement of said value of a distance between the idealized line and the second pixel, and wherein said entry is a function of a slope of the idealized line and a width of the idealized line.

7. The method as recited in claim 1, wherein said computer further includes an alpha memory for storing said coverage, and further comprising after step (f) the steps of:

reading an alpha value from said alpha memory;

combining said alpha value with said coverage to form a new alpha value; and writing said new alpha value into said alpha memory.

8. A method for drawing an antialiased polygon mesh comprised of a plurality of adjacent, nonoverlapping, filled polygons, each of the polygons including an edge having a start point and an end point on a display of a computer having a memory for storing a color value for each pixel to be drawn on the display before outputting the color value to the display, comprising the steps of:

rendering the mesh and storing data for rendered pixels of the mesh in said memory; then, for each edge of a polygon of the mesh, (a) selecting a first pixel closest to an idealized line between the start point and the end point and claimed by the edge of the polygon as a filled pixel;

(b) selecting a second pixel adjacent to the first pixel, the first pixel and the second pixel forming a pair of pixels straddling the idealized line;

(c) determining a coverage for the second pixel as a function of a value of a distance between the idealized line and the second pixel;

(d) determining an intensity for the second pixel as a function of the coverage;

(e) writing a color value into the memory for said second pixel based on the intensity of the second pixel;

(f) outputting the color value for the second pixel to the display;

(g) repeating steps (a) through (f) until color values for each of a plurality of second pixels between the start point and the end point have been output to the display: and (h) repeating steps (a) through (g) until color values for each of a plurality of second pixels between the start point and the end point of each edge of each polygon of the mesh have been output to the display.

9. The method as recited in claim 8, wherein the first pixel closest to the idealized line for a first pair of pixels is a first pixel closest to the start point and wherein the first pixel closest to the idealized line for a last pair of pixels is a first pixel closest to the end point.

10. The method as recited in claim 9, wherein for said first pixel closest to said end point, step (c) includes the step of determining said coverage by locating an entry in a look-up table of said memory indexed by said value of a distance between the idealized line and the second pixel, wherein said entry is a function of a slope of the idealized line and a width of the idealized line, and wherein said entry is multiplied by a fractional component of a coordinate of said end point.

11. The method as recited in claim 9, wherein for said first pixel closest to said start point, step (c) includes the step of determining said coverage by locating an entry in a look-up table of said memory indexed by said value of a distance between the idealized line and the second pixel, wherein said entry is a function of a slope of the idealized line and a width of the idealized line, and wherein said entry is multiplied by a one's complement of a fractional component of a coordinate of said start point.

12. The method as recited in claim 8, wherein step (c) includes the step of determining said coverage by locating an entry in a look-up table of said memory indexed by said value of a distance between the idealized line and the second pixel, and wherein said entry is a function of a slope of the idealized line and a width of the idealized line.

13. The method as recited in claim 8, wherein step (c) includes the step of determining said coverage by locating an entry in a look-up table of said memory indexed by a one's complement of said value of a distance between the idealized line and the second pixel, and wherein said entry is a function of a slope of the idealized line and a width of the idealized line.

14. The method as recited in claim 8, wherein said computer further includes an alpha memory for storing said coverage, and further comprising after step (f) the steps of:
reading an alpha value from said alpha memory;
combining said alpha value with said coverage to form a new alpha value; and
writing said new alpha value into said alpha memory.

* * * * *